(12) United States Patent
Moon

(10) Patent No.: US 11,054,869 B2
(45) Date of Patent: Jul. 6, 2021

(54) ELECTRONIC DEVICE INCLUDING DUSTPROOF STRUCTURE

(71) Applicant: Samsung Electronics Co., Ltd., Suwon-si (KR)

(72) Inventor: Heecheul Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/069,332

(22) Filed: Oct. 13, 2020

(65) Prior Publication Data

US 2021/0116975 A1 Apr. 22, 2021

(30) Foreign Application Priority Data

Oct. 21, 2019 (KR) .................... 10-2019-0130841

(51) Int. Cl.
*G06F 1/16* (2006.01)

(52) U.S. Cl.
CPC .......... *G06F 1/1681* (2013.01); *G06F 1/1652* (2013.01); *G06F 1/1656* (2013.01)

(58) Field of Classification Search
CPC combination set(s) only.
See application file for complete search history.

(56) References Cited

U.S. PATENT DOCUMENTS

| | | | |
|---|---|---|---|
| 8,713,759 B2 * | 5/2014 | Cai | G06F 1/1681 16/366 |
| 8,971,031 B2 * | 3/2015 | Mok | G06F 1/1656 361/679.27 |
| 8,976,324 B2 | 3/2015 | Yang et al. | |
| 9,389,648 B2 | 7/2016 | Senatori | |
| 9,435,939 B2 | 9/2016 | Yahng et al. | |
| 9,564,473 B2 * | 2/2017 | Yamazaki | H01L 27/3244 |
| 9,600,035 B2 * | 3/2017 | Park | G06F 1/1652 |
| 9,780,160 B2 * | 10/2017 | Yamazaki | H01L 27/3293 |
| 10,067,535 B2 | 9/2018 | Prest et al. | |
| 10,104,790 B2 | 10/2018 | Lee et al. | |
| 10,436,979 B2 | 10/2019 | Yang et al. | |

(Continued)

FOREIGN PATENT DOCUMENTS

| | | |
|---|---|---|
| EP | 1 939 470 A1 | 7/2008 |
| EP | 3 264 732 A1 | 1/2018 |

(Continued)

OTHER PUBLICATIONS

Extended European Search Report dated Mar. 2, 2021, issued in European Application No. 20201428.8.

(Continued)

*Primary Examiner* — Lisa Lea-Edmonds
(74) *Attorney, Agent, or Firm* — Jefferson IP Law, LLP

(57) ABSTRACT

An electronic device is provided. The electronic device includes a first housing, a second housing, a hinge housing disposed between the first housing and the second housing, and a flexible display at least partially disposed on the first housing and the second housing. The first housing and the second housing perform a folding or unfolding operation based on the hinge housing, and include at least one fiber structure disposed on at least a portion of a side of the first housing, the portion of the side being adjacent to the hinge housing within a predetermined distance.

25 Claims, 18 Drawing Sheets

(56) References Cited

U.S. PATENT DOCUMENTS

| | | | |
|---|---|---|---|
| 10,551,874 B2 | 2/2020 | Prest et al. | |
| 10,551,880 B1* | 2/2020 | Ai | G06F 1/1641 |
| 10,600,997 B2 | 3/2020 | Yang et al. | |
| 10,635,141 B2 | 4/2020 | Silvanto et al. | |
| 2008/0148640 A1* | 6/2008 | Marron | A46B 5/06 49/355 |
| 2008/0309017 A1* | 12/2008 | Mattice | H02G 3/22 277/355 |
| 2009/0231786 A1 | 9/2009 | Takamori et al. | |
| 2010/0181043 A1* | 7/2010 | Mueller | F28D 19/041 165/4 |
| 2011/0292314 A1 | 12/2011 | Chen et al. | |
| 2012/0014052 A1 | 1/2012 | Senatori | |
| 2012/0307472 A1* | 12/2012 | Bohn | G06F 1/1652 361/807 |
| 2013/0042456 A1* | 2/2013 | Anand | F16J 15/3288 29/428 |
| 2014/0041156 A1* | 2/2014 | Mascari | E05F 5/003 16/93 R |
| 2015/0337966 A1* | 11/2015 | Shoji | F16J 15/3288 277/355 |
| 2016/0178062 A1* | 6/2016 | Hofmann | F01D 11/00 277/355 |
| 2016/0334836 A1* | 11/2016 | Hong | G06F 1/1686 |
| 2016/0341892 A1 | 11/2016 | Yang et al. | |
| 2017/0092892 A1* | 3/2017 | Zhang | H01L 51/5253 |
| 2017/0374749 A1 | 12/2017 | Lee et al. | |
| 2018/0059738 A1* | 3/2018 | Knoppert | G06F 1/1615 |
| 2018/0113493 A1 | 4/2018 | Silvanto et al. | |
| 2019/0196544 A1* | 6/2019 | Mizoguchi | G06F 1/1683 |
| 2020/0166974 A1* | 5/2020 | Ai | G06F 1/1641 |
| 2020/0212340 A1* | 7/2020 | Ai | H01L 51/524 |
| 2020/0267244 A1* | 8/2020 | Kim | H05K 5/0086 |
| 2020/0272207 A1 | 8/2020 | Silvanto et al. | |

FOREIGN PATENT DOCUMENTS

| | | |
|---|---|---|
| JP | 56-022228 A | 3/1981 |
| JP | 2018-116467 A | 7/2018 |
| KR | 10-2019-0001864 A | 1/2019 |

OTHER PUBLICATIONS

International Search Report dated Jan. 29, 2021, issued in International Application No. PCT/KR2020/013897.

* cited by examiner

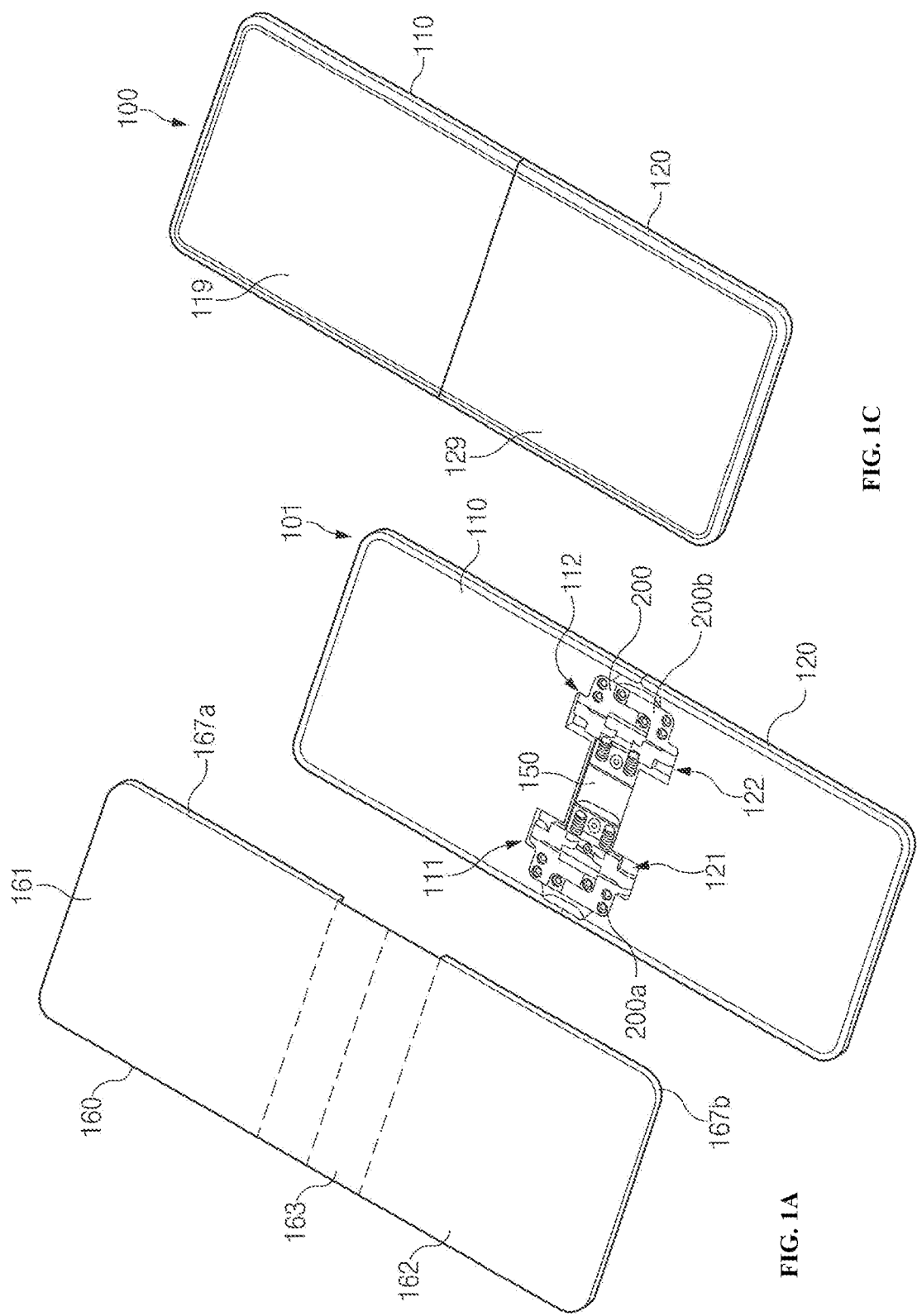

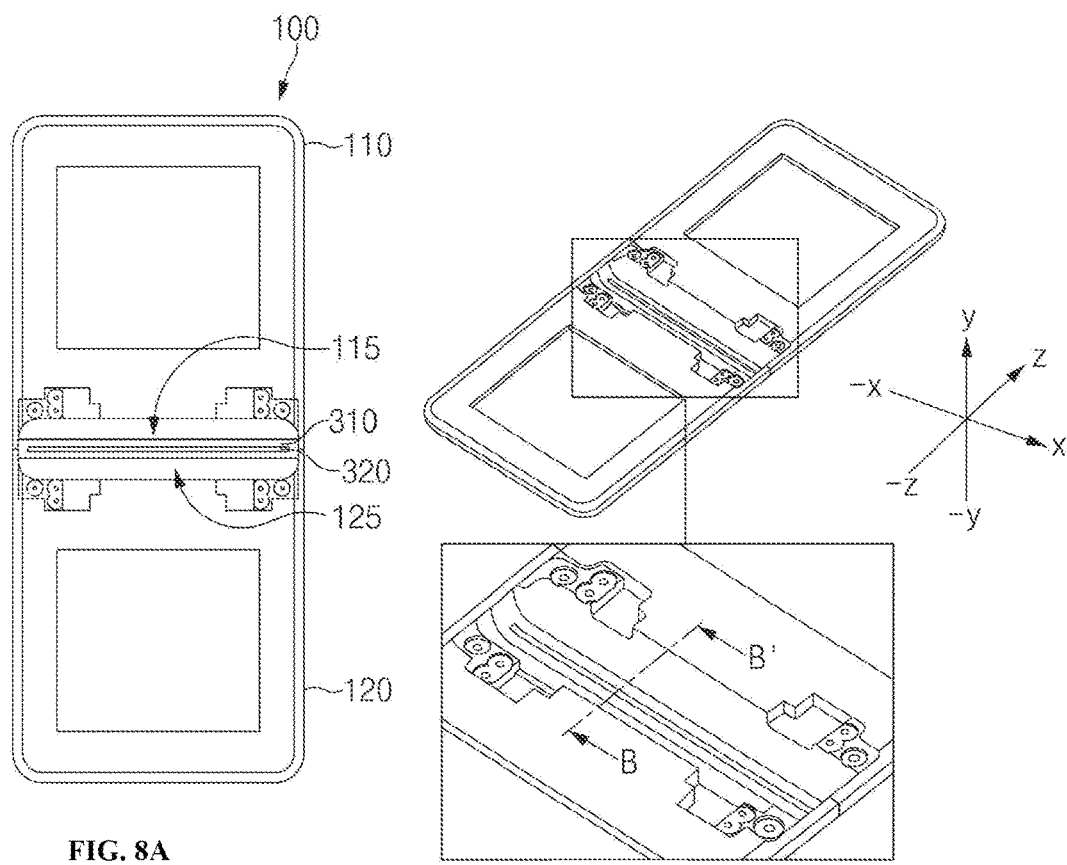
FIG. 8A
FIG. 8B
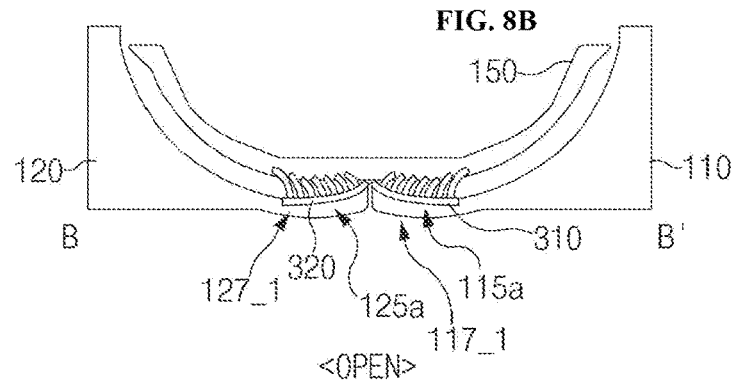
<OPEN>
FIG. 8C
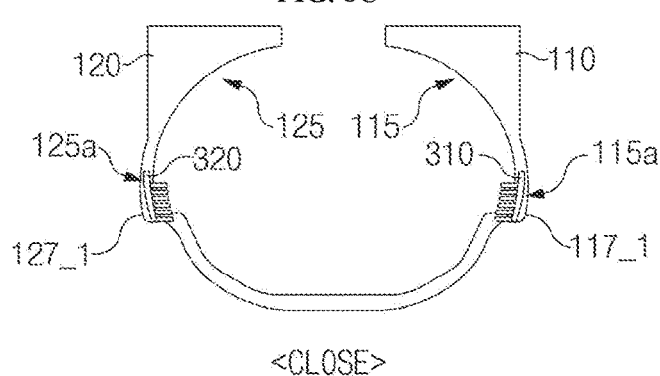
<CLOSE>
FIG. 8D

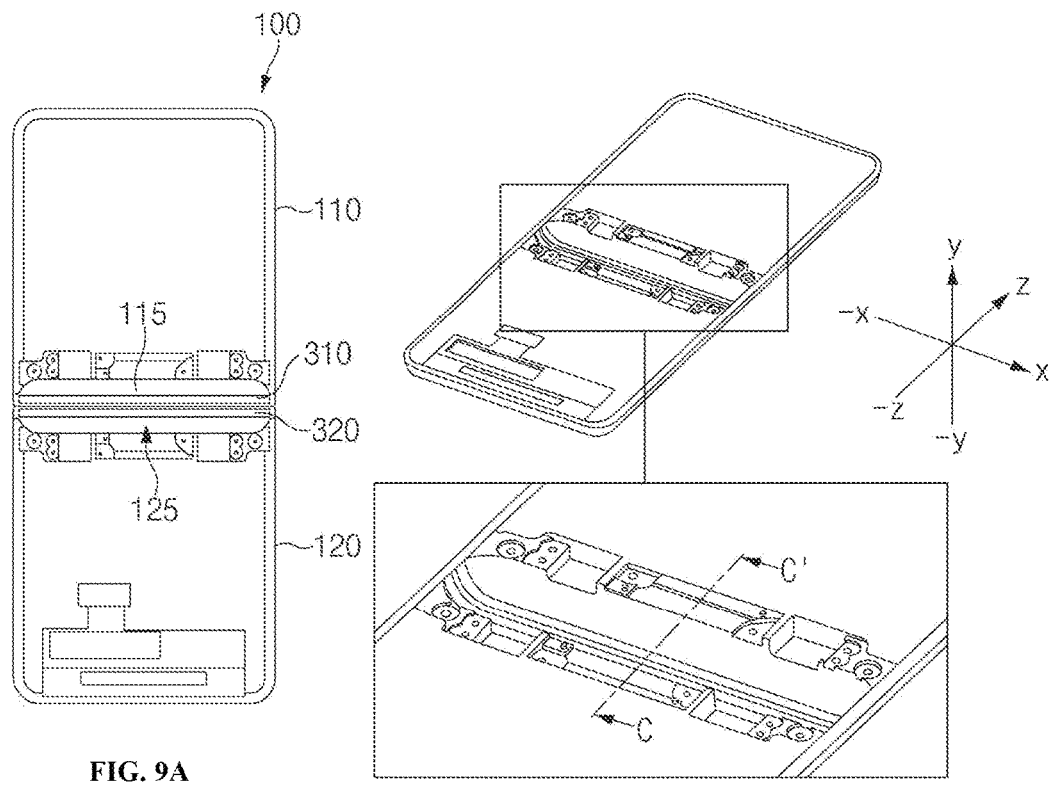
FIG. 9A
FIG. 9B
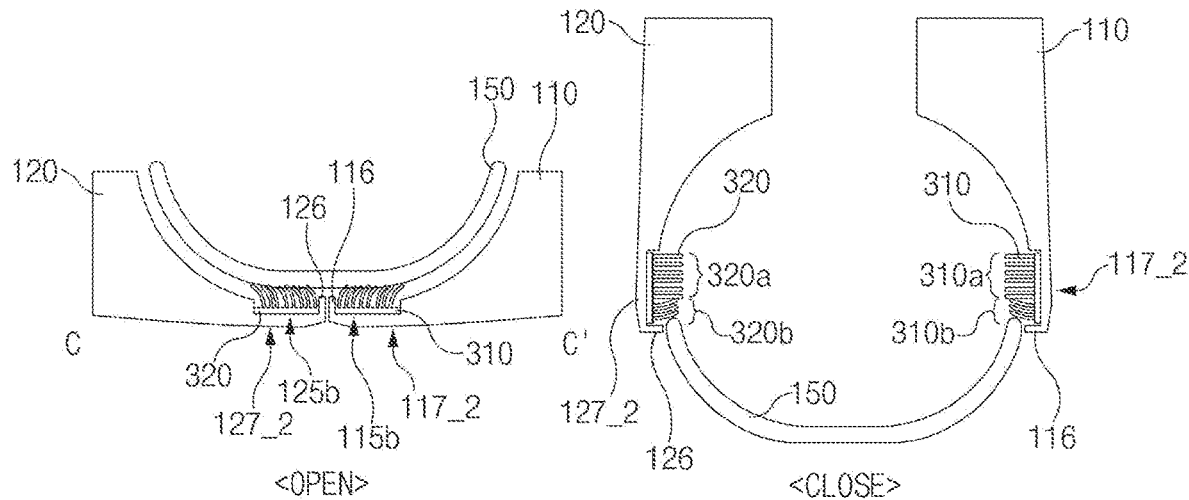
FIG. 9C
FIG. 9D

<OPEN>     <CLOSE>

ELECTRONIC DEVICE INCLUDING DUSTPROOF STRUCTURE

CROSS-REFERENCE TO RELATED APPLICATION(S)

This application is based on and claims priority under 35 U.S.C. § 119(a) of a Korean patent application number 10-2019-0130841, filed on Oct. 21, 2019 in the Korean Intellectual Property Office, the disclosure of which is incorporated by reference herein in its entirety.

BACKGROUND

1. Field

The disclosure relates to an electronic device including a dustproof structure.

2. Description of Related Art

Portable electronic devices such as smartphones may provide various functions, such as a call, video playback, and internet search, based on various types of applications. Users may want to use the above-mentioned various functions through a wider screen. However, as the screen becomes larger, it is likely to decrease portability. Accordingly, foldable portable electronic devices have been developed that utilizes a foldable structure to increase portability of the portable electronic devices.

The above information is presented as background information only to assist with an understanding of the disclosure. No determination has been made, and no assertion is made, as to whether any of the above might be applicable as prior art with regard to the disclosure.

SUMMARY

A foldable electronic device may be disposed to be rotated by a hinge structure connected with adjacent housings and supporting the housings while the housings rotate at a predetermined angle. With regard to a hinge operation of the housings, various structures may be arranged. However, for the foldable electronic device, a gap may be formed in the folding region, and foreign matter may be easily introduced into the gap. If foreign matter introduced through the gap is located under a display, the display may be damaged by the hinge operation. In addition, if the introduced foreign matter is caught in the hinge structure, normal hinge operations may not be possible.

Aspects of the disclosure are to address at least the above-mentioned problems and/or disadvantages and to provide at least the advantages described below. Accordingly, an aspect of the disclosure is to provide an electronic device including a dustproof structure capable of preventing foreign matter from being introduced into the foldable electronic device.

Another aspect of the disclosure is to provide a hinge structure including a first housing, a second housing, a hinge housing disposed between the first housing and the second housing, and a flexible display at least partially disposed on the first housing and the second housing. The first housing and the second housing may perform a folding or unfolding operation based on the hinge housing, and include at least one fiber structure disposed on at least a portion of a side of the first housing, the side of the first housing being adjacent to the hinge housing within a predetermined distance.

Additional aspects will be set forth in part in the description which follows and, in part, will be apparent from the description, or may be learned by practice of the presented embodiments.

In accordance with an aspect of the disclosure, an electronic device is provided. The electronic device includes a dustproof structure according to various embodiments of the disclosure, closing a gap between a hinge housing and housings so as to prevent foreign matter from being introduced into the electronic device, thereby preventing a variety of damage caused by foreign matter.

In addition, by providing a dustproof structure as a fiber structure in the electronic device according to various embodiments of the disclosure, it is possible to maintain the dustproof characteristic even under repeated hinge operations.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1A is a perspective view illustrating an electronic device in a first state, according to an embodiment of the disclosure;

FIG. 1B is another perspective view illustrating an electronic device in a first state, according to an embodiment of the disclosure;

FIG. 1C is another perspective view illustrating an electronic device in a first state, according to an embodiment of the disclosure;

FIG. 8A is a diagram illustrating an example of housings to which a dustproof structure is applied in an electronic device according to an embodiment of the disclosure;

FIG. 8B is another diagram illustrating an example of housings to which a dustproof structure is applied in an electronic device according to an embodiment of the disclosure;

FIG. 8C is another diagram illustrating an example of housings to which a dustproof structure is applied in an electronic device according to an embodiment of the disclosure;

FIG. 8D is another diagram illustrating an example of housings to which a dustproof structure is applied in an electronic device according to an embodiment of the disclosure;

FIG. 9A is a diagram illustrating an example of housings to which a dustproof structure is applied in an electronic device according to an embodiment of the disclosure;

FIG. 9B is another diagram illustrating an example of housings to which a dustproof structure is applied in an electronic device according to an embodiment of the disclosure;

FIG. 9C is another diagram illustrating an example of housings to which a dustproof structure is applied in an electronic device according to an embodiment of the disclosure;

FIG. 9D is another diagram illustrating an example of housings to which a dustproof structure is applied in an electronic device according to an embodiment of the disclosure;

Throughout the drawings, it should be noted that like reference numbers are used to depict the same or similar elements, features, and structures.

DETAILED DESCRIPTION

Figure 1D:
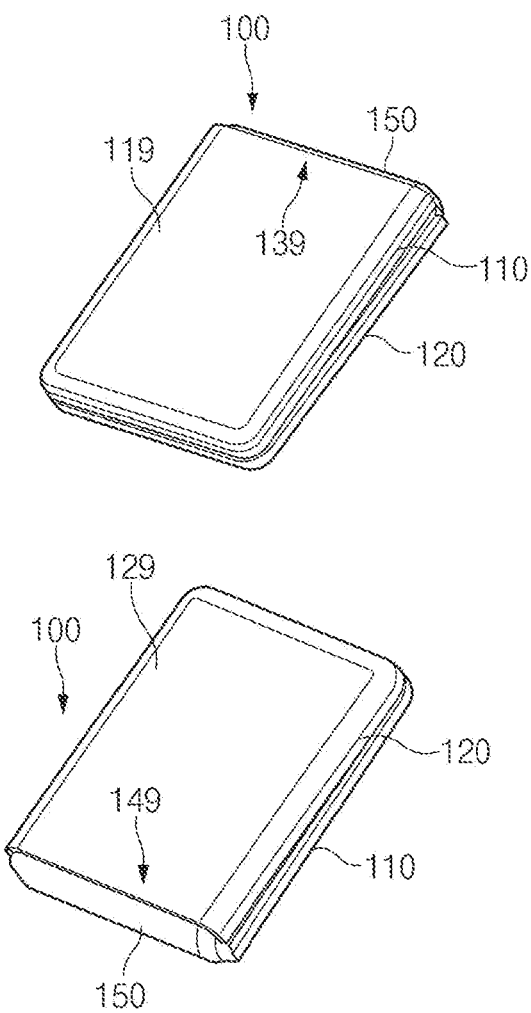
FIG. 1D is a diagram illustrating an example of an external appearance of the electronic device in a second state, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used here, terms and phrases such as "have," "may have," "include," or "may include" indicates the existence of features (e.g., numbers, functions, actions, or parts such as components), and do not exclude the existence of additional features.

As used here, the phrases "A or B," "at least one of A or/and B," or "one or more of A or/and B" may include all possible combinations of the items listed together. For example, "A or B," "at least one of A and B," or "at least one of A or B" may indicate all of (1) including at least one A, (2) including at least one B, or (3) including both at least one A and at least one B.

As used here, the terms such as "first," "second," "the first," or "the second" may modify various components, regardless of order and/or importance, and are used to distinguish one component from another, but does not limit the components. For example, the first user device and the second user device may indicate different user devices regardless of order or importance. For example, without departing from the teachings disclosed in the disclosure, a first element could be termed a second element, and similarly, in reverse, a second element could be termed a first element.

When a component (e.g., first component) is referred to as being "(operatively or communicatively) coupled with/to" or "connected to" another component (e.g., second component), it should be understood that any of the above components may be directly connected to another component, or may be connected via another component (e.g., a third component). In contrast, when a certain component (e.g., first component) is referred to as being "directly coupled" or "directly connected" to another component (e.g., the second component), it is to be understood that no other component (e.g., third component) intervenes between the certain component and the other component.

As used here, the phrase, "configured to (or set to)," may be interchangeably used with, for example, "suitable for," "having the capacity to," "designed to," "adapted to," "made to," or "capable of," depending on the circumstances. The phrase "configured (or set) to" may not necessarily mean only "specifically designed to" in hardware. Rather, in some circumstances, the phrase "device configured to" may mean that the device "can" perform an operation with other devices or parts. For example, the phrase "processor configured (or set) to perform A, B, and C" may mean a dedicated processor (e.g., embedded processor) for performing corresponding operations, or a generic-purpose processor (e.g., central processing unit (CPU) or application processor) that performs the operations by executing one or more software programs stored in a memory device.

The terms and phrases as used here are merely provided to describe specific embodiments, and may not be intended to limit the scope of other embodiments. A singular form is intended to include a plural form, unless the context clearly indicates otherwise. Terms, including technical or scientific terms, as used here, may have the same meaning as commonly understood by a person skilled in the art to which the embodiments of the disclosure belong. Terms such as those defined in commonly-used dictionaries should be interpreted as having a meaning that is consistent with their meaning in the context of the relevant art and will not be interpreted in an idealized or overly formal sense unless expressly so defined here. In some cases, even terms defined here cannot be interpreted to exclude embodiments of the disclosure.

Examples of an electronic device according to various embodiments of the disclosure may include at least one of a smartphone, a tablet personal computer (PC), a mobile phone, a video phone, an e-book reader, a desktop PC, a laptop personal computer, a netbook computer, a workstation, a server, a personal digital assistant (PDA), a portable multimedia player (PMP), an MP3 player, a mobile medical device, a camera, or a wearable device. According to various embodiments, the wearable device may include at least one of an accessory-type device (e.g., watches, rings, bracelets, anklets, necklaces, glasses, contact lenses, or head-mounted devices (HMD), a textiles or clothing integrated-type device (e.g., electronic clothing), a body attachment-type device (e.g., skin pads or tattoo), or a bio-implantable-type device (implantable circuits).

Hereinafter, an electronic device according to various embodiments will be described with reference to the accompanying drawings. In the disclosure, the term user may refer to a person using an electronic device or a device using the electronic device (e.g., an artificial intelligence electronic device).

FIGS. 1A-1C are perspective views illustrating an electronic device in a first state, according to an embodiment of the disclosure and FIG. 1D is a diagram illustrating an example of an external appearance of the electronic device in a second state, according to an embodiment of the disclosure.

Referring to FIGS. 1A-1D, an electronic device (or a foldable electronic device) 100 according to an embodiment of the disclosure may include a housing 101 including a first housing 110 and a second housing 120, a display 160 (e.g., flexible display), and a hinge housing 150 disposed inside a hinge structure 200 (or hinge configuration). FIGS. 1A-1C are perspective views of the electronic device 100 in the first state (e.g., flat state or unfolded state), and FIG. 1D is a perspective view of the electronic device 100 in the second state (e.g., folded state). Additionally or alternatively, the electronic device 100 may further include a first cover 119 covering the back portion of the first housing 110 and a second cover 129 covering the back portion of the second housing 120.

According to various embodiments of the disclosure, depending on the arrangement, the first housing 110 may be continuous with the second housing 120 (e.g., when a center portion 163 of the display 160 is flattened or when the housing 101 is in an unfolded state), or may be side by side with the second housing 120. Alternatively, when the center portion 163 of the display 160 is folded, one surface of the first housing 110 may be arranged to face one surface of the second housing 120.

The first housing 110 may be, for example, formed, at least partially, of a metal material, or may be formed, at least partially, of a non-metal material. For example, the first housing 110 may be formed of a material having a certain rigidity in order to support at least a portion of the display 160. On at least a portion of the front surface of the first housing 110, one region of the display 160 (e.g., a first region 161 of the display 160 and a portion of the center portion 163) may be disposed. At least a portion of the first housing 110 may adhere to the first region 161 of the display 160. Alternatively, at least a portion of the front edge of the first housing 110 may adhere to the edge of the first region 161 of the display 160. Alternatively, the upper side of the front surface of the first housing 110 may adhere to one side of the first region 161 of the display 160. In this regard, a first adhesive layer 167a may be disposed at least partially between the first housing 110 and the first region 161 of the display 160. The first housing 110 is provided at least partially in a hollow shape, or is provided such that an empty space is formed by being coupled with the first cover 119, and thus electronic elements required for driving the display 160 (e.g., a printed circuit board, at least one processor mounted on the printed circuit board, at least one memory, and an element such as a battery) may be disposed.

According to various embodiments of the disclosure, edges of the first housing 110 (e.g., three edges except for a remaining edge 139 which is disposed side by side with the second housing 120 in the unfolded state of the display 160 of the electronic device 100) may protrude at a predetermined height from the bottom surface of the center portion of the housing to surround at least one side edge of the display 160. Alternatively, on at least one of the edges of the first housing 110, sidewalls facing at least a portion of the edge of the display 160 may be disposed. The sidewalls formed at least partially on edges of the first housing 110 may be formed to have a specified height at the three edges except for the remaining edge 139 which is disposed side by side with the second housing 120 in the unfolded state of the display 160. The edge 139 of the first housing 110 facing the second housing 120 in the unfolded state of the display 160 may have a predetermined curvature at least partially such that at least a portion of the hinge housing 150 may be disposed. For example, the edge of the first housing 110 (or the second housing 120) may be recessed in a predetermined direction with a curvature. According to various embodiments of the disclosure, on the edge 139 of the first housing 110 facing the second housing 120 in the unfolded state of the display 160, a first stepped portion 111 and a second stepped portion 112 may be formed. At least a portion of a first hinge structure 200a may be seated on the first stepped portion 111. At least a portion of a second hinge structure 200b may be seated on the second stepped portion 112.

According to various embodiments of the disclosure, depending on the arrangement, the second housing 120 may be side by side with the first housing 110, or at least one surface of the second housing 120 may be side by side with one surface of the first housing 110 (e.g., the surface on which the display 160 is disposed) in the unfolded state of the display 160. The second housing 120 may be made of the same material as the first housing 110. As the second housing 120 and the first housing 110 are arranged to be bilaterally or vertically symmetrical in shape, the front surface of the second housing 120 may support at least a portion of the region (e.g., a second region 162 of the display 160 and the other part of the center portion 163) other than the region disposed on the housing 110 in the display 160. According to various embodiments of the disclosure, at least a portion of the second housing 120 may be made of a different material from the first housing 110, and may be formed to be asymmetrical to the first housing 110 bilaterally or vertically in shape. For example, the area of the back surface of the second housing 120 may be different from that of the back surface of the first housing 110.

At least a portion of the second housing 120 may adhere to the second region 162 of the display 160. Alternatively, the front edge of the second housing 120 may adhere to the edge of the second region 162 of the display 160. Alternatively, the lower side of the front surface of the second housing 120 may adhere to one side of the second region 162 of the display 160. In this regard, a second adhesive layer 167b may be disposed at least partially between the second housing 120 and the second region 162 of the display 160. The second housing 120 may be provided at least partially in a hollow shape, similar to the first housing 110, or may be provided such that an empty space is formed by being coupled with the second cover 129, in which electronic elements required for driving the display 160 may be disposed.

According to various embodiments of the disclosure, edges of the second housing 120 (e.g., three edges except for a remaining edge 149 which is disposed side by side with the first housing 110 in the unfolded state of the display 160) may protrude at a predetermined height from the bottom surface of the center portion of the second housing 120 to surround the other side edge of the display 160. Alternatively, on at least one of the edges of the second housing 120, sidewalls facing at least a portion of the edge of the display 160 may be disposed, which are similar to the sidewalls formed on the first housing 120. The sidewalls formed at least partially on edges of the second housing 120 may be formed to have a specified height at the three edges except for the remaining edge 149 which is disposed side by side with the first housing 110 in the unfolded state of the display 160.

The portion of the second housing 120 facing the first housing 110 may have a predetermined curvature at least partially such that the hinge housing 150 may be disposed. According to various embodiments of the disclosure, on the edge 149 of the second housing 120 adjacent to the first housing 110, a third stepped portion 121 on which at least a portion of the first hinge structure 200a is seated and a fourth stepped portion 122 on which at least a portion of the second hinge structure 200b is seated may be formed.

According to various embodiments of the disclosure, the electronic device 100 may include at least one sensor disposed on one of the first housing 110 or the second housing 120 and related to operation of a specific function of the electronic device 100. The sensor may include, for example, at least one of a proximity sensor, an illuminance sensor, an iris sensor, an image sensor (or camera), or a fingerprint sensor. According to various embodiments of the disclosure, at least one of the sensors may be disposed under the display 160 and pick up sensing information through a direction in which the screen is displayed on the display 160.

According to various embodiments of the disclosure, depending on the folded or unfolded state of the electronic device 100, the hinge housing 150 may be covered by one of the first housing 110 and the second housing 120 (e.g., the unfolded state of the housing 101), or may be exposed to the outside (e.g., the folded state of the housing 101). For example, as in FIGS. 1A-1C, if the first housing 110 and the second housing 120 are arranged side by side, the hinge housing 150 may be covered by the first housing 110 and the second housing 120. As in FIG. 1D, if one surface of the first housing 110 and one surface of the second housing 120 are arranged to face each other, the hinge housing 150 may be disposed such that at least a portion thereof is exposed to the outside at side edges of the first housing 110 and the second housing 120 (e.g., the edges of the first housing 110 and the second housing 120 facing each other in the unfolded state). According to various embodiments of the disclosure, at least a portion of the first hinge housing 150 and the second housing 120 may be flexible.

According to various embodiments of the disclosure, at least a portion of the display 160 may have flexibility. According to an embodiment of the disclosure, the display 160 may include the first region 161 or an upper region disposed on the first housing 110, the second region 162 or a lower region disposed on the second housing 120, and a center portion 163 or a central region adjacent to the first housing 110 and the second housing 120. According to various embodiments of the disclosure, the entire display 160 may have flexibility. Alternatively, at least a portion of the center portion 163 of the display 160 may have flexibility. The center portion 163 of the display 160 may be disposed such that the first housing 110 and the second housing 120 does not adhere to each other. For example, the center portion 163 of the display 160 may have a nonadhesive state to at least a portion of the first housing 110 and the second housing 120. The first region 161 of the display 160 may adhere to at least a portion of the first housing 110, and the second region 162 of the display 160 may adhere to at least a portion of the second housing 120. In this regard, the first adhesive layer 167a may be disposed in at least a portion of the region between the display 160 and the first housing 110, and the second adhesive layer 167b may be disposed in at least a portion of the region between the display 160 and the second housing 120. The first adhesive layer 167a and the second adhesive layer 167b may be disposed only on the edges of the first housing 110 and the second housing 120.

Figures 2A, 2B, 2C:
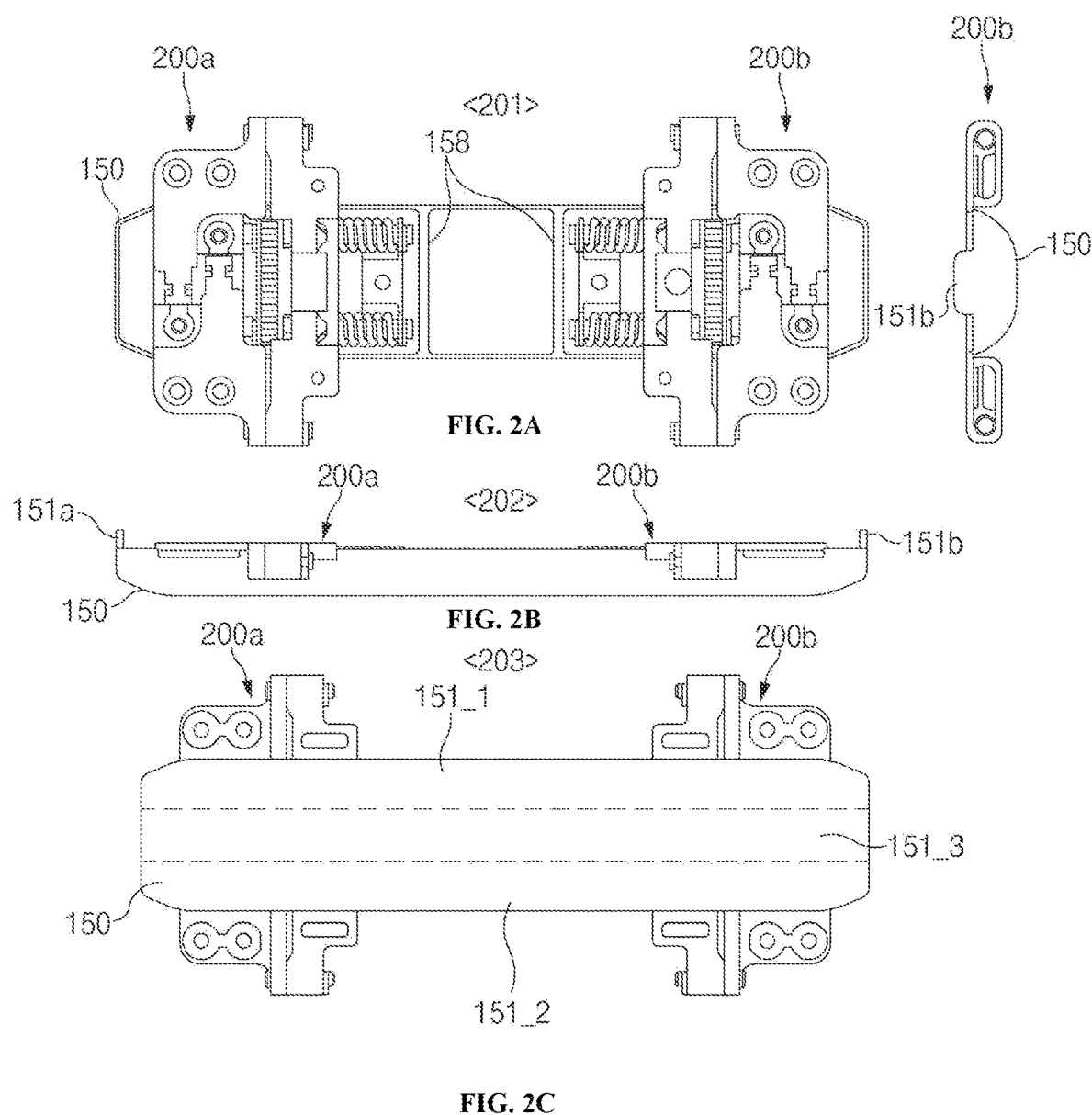
FIG. 2A is a diagram illustrating an example of a hinge structure and a hinge housing of an electronic device according to an embodiment of the disclosure.
FIG. 2B is another diagram illustrating an example of a hinge structure and a hinge housing of an electronic device according to an embodiment of the disclosure.
FIG. 2C is another diagram illustrating an example of a hinge structure and a hinge housing of an electronic device according to an embodiment of the disclosure.

FIGS. 2A-2C are diagrams illustrating an example of a hinge structure and a hinge housing of an electronic device according to an embodiment of the disclosure.

Referring to FIGS. 2A-2C, according to an embodiment of the disclosure, the electronic device may include a plurality of hinge structures. In the illustrated drawing, the first hinge structure 200a and the second hinge structure 200b are arranged in the hinge housing 150. In FIGS. 2A-2C, state 201 is a state in which the hinge housing 150 is viewed from above, state 202 is a state in which the hinge housing 150 is viewed from the side, and state 203 is a state in which the hinge housing 150 is viewed from the back. According to various embodiments of the disclosure, three or more hinge structures may be arranged in the hinge housing 150.

The first hinge structure 200a may be disposed on one side of the hinge housing 150 (e.g., the left side based on the illustrated drawing). The first hinge structure 200a may be coupled to the left side of the first housing 110 and the left side of the second housing 120 and may be rotated within a specified range with respect to the horizontal axis of the hinge housing 150. The first hinge structure 200a may be arranged symmetrically to the second hinge structure 200b with respect to the center portion of the hinge housing 150.

The second hinge structure 200b may be disposed on another side of the hinge housing 150 (e.g., the right side based on the illustrated drawing). The second hinge structure 200b may be coupled to the right side of the first housing 110 and the right side of the second housing 120 and may be rotated within a specified range with respect to the horizontal axis of the hinge housing 150. The second hinge structure 200b may be arranged symmetrically to the first hinge structure 200a with respect to the center portion of the hinge housing 150. The second hinge structure 200b may have the same structure and configuration as the first hinge structure 200a, but may be disposed at a different position from the first hinge structure 200a.

The hinge housing 150 may be provided in a hollow semi-cylindrical shape or a ship shape in which a pipe closed at both ends is cut in the longitudinal direction. According to various embodiments of the disclosure, the hinge housing 150 may include a flat bottom portion 151_3, and a first rib 151_1 and a second rib 151_2 formed on both sides of the bottom portion 151_3 with a predetermined curvature. The first rib 151_1 and the second rib 151_2 may be symmetrically arranged on both sides around the bottom portion 151_3. The hinge housing 150 may gradually decrease in width from the center to the left and right ends based on the illustrated drawing. At least one partition wall 158 may be formed inside the hinge housing 150 to separate the interior space of the hinge housing 150. The first hinge structure 200a and the second hinge structure 200b may be at least partially seated in separated spaces, respectively. On the right and left ends of the hinge housing 150, obstruction walls 151a and 151b may be formed which protrude more than the surroundings such that the inside of the hinge housing 150 is not observed from the outside. The hinge housing 150 may be formed of the same material as the first hinge structure 200a or the second hinge structure 200b.

Figure 3:
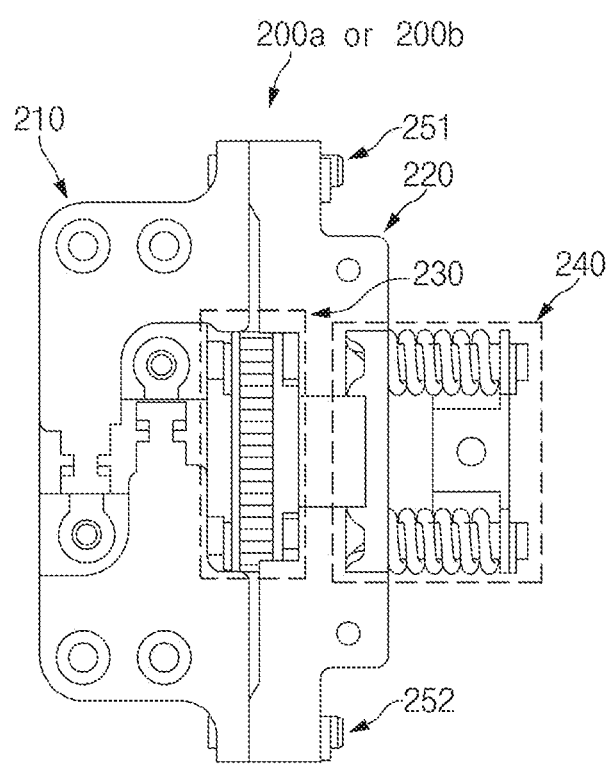
FIG. 3 is a diagram illustrating one surface of a hinge structure applied to an electronic device according to an embodiment of the disclosure.

FIG. 3 is a diagram illustrating one surface of a hinge structure applied to an electronic device according to an embodiment of the disclosure.

Referring to FIG. 3, the hinge structure 200a or 200b may be any one of the first hinge structure 200a and the second hinge structure 200b described above. The hinge structures 200a and 200b may include a bracket structure 210, an arm structure 220, a gear structure 230, and a support structure 240.

The bracket structure 210 may be coupled with the arm structure 220 with its central portion being fixed to the hinge housing 150 and both wings (e.g., rotating brackets) being coupled with the first housing 110 and the second housing 120.

The arm structure 220 may be connected to the bracket structure 210 at one side through fixing parts 251 and 252, and may have a mounting angle changed while sliding along the side of the bracket structure 210 with the hinge operation. The arm structure 220 may include a cam structure. The arm structure 220 including the cam structure may be engaged with a cam portion 241 disposed on the support structure 240 to provide a detent feeling during the hinge operation of the first housing 110 and the second housing 120.

The gear structure 230 may be disposed between the bracket structure 210 and the arm structure 220. The gear structure 230 may transmit a force such that the second housing 120 rotates together when the first housing 110 rotates. In this regard, the gear structure 230 may include a plurality of axial gears and idle gears.

The support structure 240 may be fixed inside the hinge housing 150 and may provide a specified pressure to the arm structure 220. In this regard, the support structure 240 may include one or more elastic bodies, and may push the cam portion 241 in the direction of the arm structure 220 based on the elastic force of the elastic bodies. In this way, the cam portion 241 may be engaged with the rotating cam structure of the arm structure 220, and thus the cam operation may be supported.

As described above, the hinge structure 200a or 200b according to an embodiment of the disclosure may include the bracket structure 210 coupled with the hinge housing 150 and the housings 110 and 120 and supporting folding or unfolding of the display 160 disposed thereon, the arm structure 220 connected to the bracket structure 210 and providing a detent feeling, the gear structure 230 supporting the simultaneous operation of the first housing 110 and the second housing 120, and the support structure 240 supporting the arm structure 220 and having shafts of the gear structure 230 fixed thereto. Based on these, the hinge structures 200a and 200b may rotate around a virtual axis formed above the surface of the bracket structure 210 to implement folding or unfolding of the display 160, and may suppress torsion of the housings 110 and 120 by providing a detent feeling based on the cam structure and supporting simultaneous hinge operation of the housings 110 and 120 based on the gear structure 230. Furthermore, the hinge structure 200a or 200b may support a specified predetermined angle, for example, a mounting state of 30 degrees or 60 degrees (e.g., the angle between the front surface of the first housing 110 and the front surface of the second housing 120) as well as unfolded state or the folded state of the housings 110 and 120.

Figure 4A:
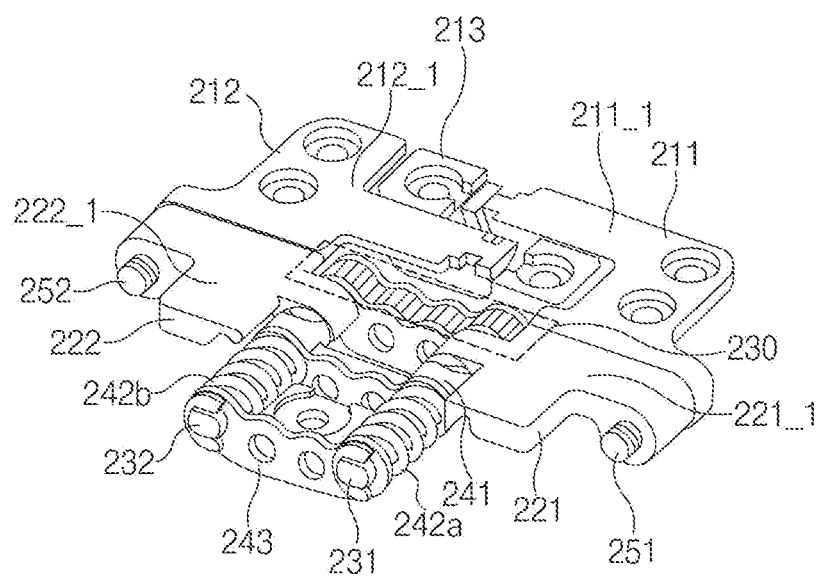
FIG. 4A is a diagram illustrating a first state of some parts of an electronic device according to an embodiment of the disclosure.
Figure 4B:
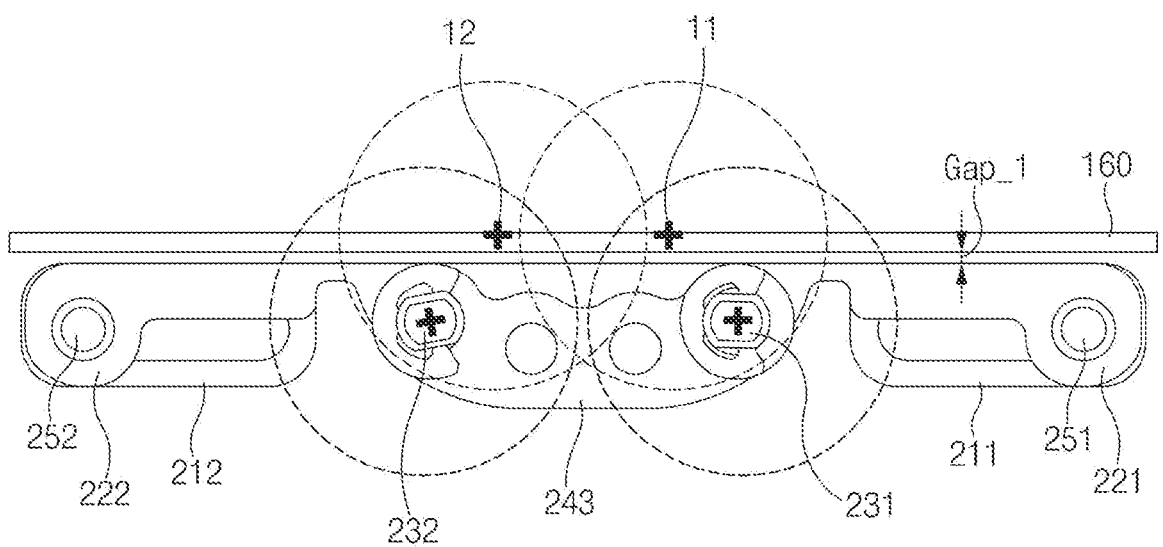
FIG. 4B is another diagram illustrating a first state of some parts of an electronic device according to an embodiment of the disclosure.

FIGS. 4A-4B are diagrams illustrating a first state of some parts of an electronic device according to an embodiment of the disclosure.

Referring to FIGS. 1A-1C and 4A-4B, some components of the electronic device may include the first hinge structure 200a and the display 160, and the first hinge structure 200a and the display 160 may have a first state (e.g., the unfolded state).

As described above, the first hinge structure 200a may include a first rotating bracket 211, a second rotating bracket 212, a fixing bracket 213, a first arm portion 221, a second arm portion 222, a gear structure 230 including axial gears and idle gears of a first rotating member 231 and a second rotating member 232, a cam portion 241, a first elastic body 242a, a second elastic body 242b, the first rotating member 231, the second rotating member 232, and a support bracket 243. The first rotating bracket 211 may be connected to the first arm portion 221 through the first fixing part 251. The second rotating bracket 212 may be connected to the second arm portion 222 through the second fixing part 252.

While the first rotating bracket 211 and the second rotating bracket 212 maintain the unfolded state, the display 160 may maintain the unfolded state. The first arm portion 221 may rotate within a specified angular range based on the first rotating member 231. The second arm portion 222 may rotate within a specified angular range based on the second rotating member 232. The first rotating bracket 211 may rotate within the same or similar angular range as the first arm portion 221 with respect to a first virtual axis 11. The second rotating bracket 212 may rotate within the same or similar angular range as the second arm portion 222 with respect to a second virtual axis 12. The first virtual axis 11 may be formed to be higher than the first rotating member 231 in a direction toward the display 160. The second virtual axis 12 may be formed to be higher than the second rotating member 232 in the direction toward the display 160. The distance between the first virtual axis 11 and the second virtual axis 12 may be shorter than the distance between the first rotating member 231 and the second rotating member 232. According to various embodiments of the disclosure, the first virtual axis 11 and the second virtual axis 12 may be formed side by side on a horizontal axis. According to an embodiment of the disclosure, the first virtual axis 11 and the second virtual axis 12 may be formed on the same layer as the display 160, or above the display 160 (e.g., the air above the display 160).

While the first rotating bracket 211 and the second rotating bracket 212 maintain the unfolded state, a first bracket body 211_1 of the first rotating bracket 211 and a second bracket body 212_1 of the second rotating bracket 212 may be arranged side by side. According to an embodiment of the disclosure, the upper surface of the first bracket body 211_1 and the upper surface of the second bracket body 212_1 may be arranged in the same way o as to face upward based on the illustrated drawing. According to an embodiment of the disclosure, while the first rotating bracket 211 and the second rotating bracket 212 maintain the unfolded state, the first arm portion 221 and the second arm portion 222 may be arranged side by side as well, and accordingly, a first basic body 221_1 of the first arm portion 221 and a second basic body 222_1 of the second arm portion 222 may be arranged to face the same direction (e.g., upward based on the illustrated drawing). Accordingly, the first bracket body 211_1, the second bracket body 212_1, the first basic body 221_1, and the second basic body 222_1 may be all arranged side by side based on the horizontal axis, and arranged to face upward based on the illustrated drawing. The first bracket body 211_1, the second bracket body 212_1, the first basic body 221_1, and the second basic body 222_1 may support the back surface of the display 160 without a height difference.

According to various embodiments of the disclosure, at the center portion where the display 160 is bent, there may be formed a predetermined gap Gap_1 with the hinge structures 200a and 200b. An adhesive layer may be disposed in a peripheral region (e.g., the first region 161 or the second region 162) other than the center portion 163 of the display 160.

Figure 5:
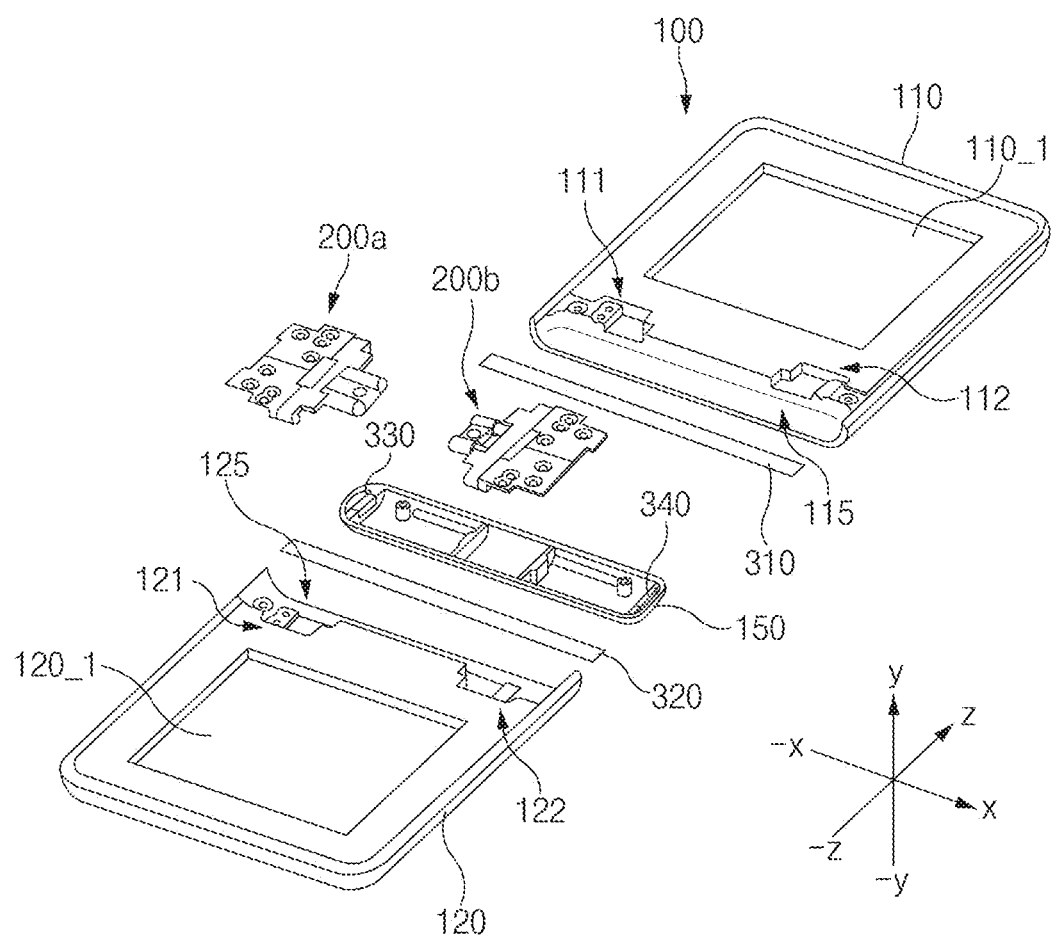
FIG. 5 is a diagram illustrating an exploded perspective view of some parts of an electronic device according to an embodiment of the disclosure.

FIG. 5 is a diagram illustrating an exploded perspective view of some parts of an electronic device according to an embodiment of the disclosure.

Referring to FIG. 5, the electronic device 100 according to an embodiment of the disclosure may include the first housing 110, the second housing 120, the hinge housing 150, the first hinge structure 200a, and the second hinge structure 200b, a first dustproof structure 310, a second dustproof structure 320, a third dustproof structure 330, and a fourth dustproof structure 340. Additionally, as described in FIGS. 1A-1C, the display may be further disposed on the first housing 110 and the second housing 120.

The first housing 110 may include an upper surface (e.g., a surface facing a y-axis) on which a portion of the display is seated, and sidewalls and a back surface (e.g., a surface facing the −y-axis) supporting the upper surface. In at least a portion of the upper surface, a seating portion 110_1 recessed or cut into the inside may be formed, and in the seating portion 110_1, a device element relating to driving the electronic device 100 (e.g., at least one of a printed circuit board, a battery, at least one sensor, a speaker, a microphone, a camera, an antenna, or a processor) may be seated. On one side of the first housing 110, for example, on one edge in a −z-axis direction, the first stepped portion 111 where a portion of the first hinge structure 200a is seated and the second stepped portion 112 where a portion of the second hinge structure 200b is seated may be formed. The first stepped portion 111 and the second stepped portion 112 may be disposed adjacent to a first bent portion 115 located at an edge in the −z-axis direction.

The first housing 110 may include, for example, sidewalls facing in three directions (e.g., the x, −x, and z-axis directions), and on the surface facing in the −z-axis direction, the first bent portion 115 related to the coupling of the hinge housing 150 may be formed. The first bent portion 115 may include a curved portion that is gradually bent in the −y-axis direction as it progresses in the z-axis to −z-axis direction. The first bent portion 115 may have a concave shape when viewed in the y-axis to −y-axis direction. The curvature of the first bent portion 115 may correspond to the curvature of the outer wall of at least a portion of the hinge housing 150. The first bent portion 115 may be disposed to be overlapped with the hinge housing 150 at least partially or with a predetermined gap, by the hinge operation. The first dustproof structure 310 may be disposed on at least a portion of the first bent portion 115. For example, the first dustproof structure 310 may be disposed on a surface traversing the first bent portion 115 in the x-axis to −x-axis direction. According to various embodiment of the disclosure, at least a portion of the first dustproof structure 310 may be disposed at the end edge of the first bent portion 115 of the first housing 110 that faces a second bent portion 125 of the second housing 120 in the state in which the electronic device 100 is unfolded.

Similar to the first housing 110, the second housing 120 may include an upper surface (e.g., a surface facing a y-axis) on which a portion of the display is seated, and sidewalls and a back surface (e.g., a surface facing the −y-axis) supporting the upper surface. In at least a portion of the upper surface, a seating portion 120_1 recessed or cut into the inside may be formed, and in the seating portion 120_1, a device element relating to driving the electronic device 100 (e.g., at least one of a printed circuit board linked to the configuration disposed in the first housing 110, an additional battery, at least one sensor, a speaker, at least one microphone, a camera, an antenna, or an additional processor) may be seated. On one side of the second housing 120, for example, on one edge in a z-axis direction, the third stepped portion 121 where another portion of the first hinge structure 200*a* is seated and the fourth stepped portion 122 where another portion of the second hinge structure 200*b* is seated may be formed. The third stepped portion 121 and the fourth stepped portion 122 may be disposed adjacent to the second bent portion 125 located at an edge in the z-axis direction.

The second housing 120 may include, for example, sidewalls facing in three directions (e.g., the x, −x, and −z-axis directions), and the second bent portion 125 related to the coupling of the hinge housing 150 may be formed on the surface facing in the z-axis direction. The second bent portion 125 may include a curved portion that is gradually bent in the −y-axis direction as it progresses in the −z-axis to z-axis direction. The second bent portion 125 may have a concave shape when viewed in the y-axis direction to −y-axis direction. The second bent portion 125 may be disposed symmetrically to the first bent portion 115 with respect to an imaginary line traversing along the −x-axis and the x-axis. Similar to the first bent portion 115, the curvature of the second bent portion 125 may correspond to at least a portion of the curvature of the outer wall of the hinge housing 150. At least a portion of the hinge housing 150 may be seated on the second bent portion 125 by the hinge operation. The second dustproof structure 320 may be disposed on at least a portion of the second bent portion 125. For example, the second dustproof structure 320 may be disposed on a surface traversing the second bent portion 125 in the x-axis to −x-axis direction. According to various embodiments of the disclosure, at least a portion of the second dustproof structure 320 may be disposed at the end edge where the first housing 110 faces the second housing 120 in the state in which the electronic device 100 is unfolded. Accordingly, the first dustproof structure 310 and the second dustproof structure 320 may be arranged side by side on the first bent portion 115 and the second bent portion 125 based on the x-axis (or based on the −x-axis), in the state in which the electronic device 100 is unfolded.

The hinge housing 150 may be disposed between the first housing 110 and the second housing 120, and may be disposed such that at least a portion thereof is exposed to the outside or covered by the first housing 110 and the second housing 120 by the hinge operation of the electronic device 100. For example, when the electronic device 100 is in the unfolded state, the hinge housing 150 may be disposed inside the first bent portion 115 of the first housing 110 and the second bent portion 125 of the second housing 120 so as not to be exposed to the outside. At least a portion of the hinge housing 150 may be disposed so as to be observed from the outside as the first housing 110 and the second housing 120 are both the sections that fold when the electronic device 100 is in the folded state. As described above in FIGS. 2A-2C, the hinge housing 150 may be provided in a hollow shape such that the first hinge structure 200*a* and the second hinge structure 200*b* are seated.

Figure 6:
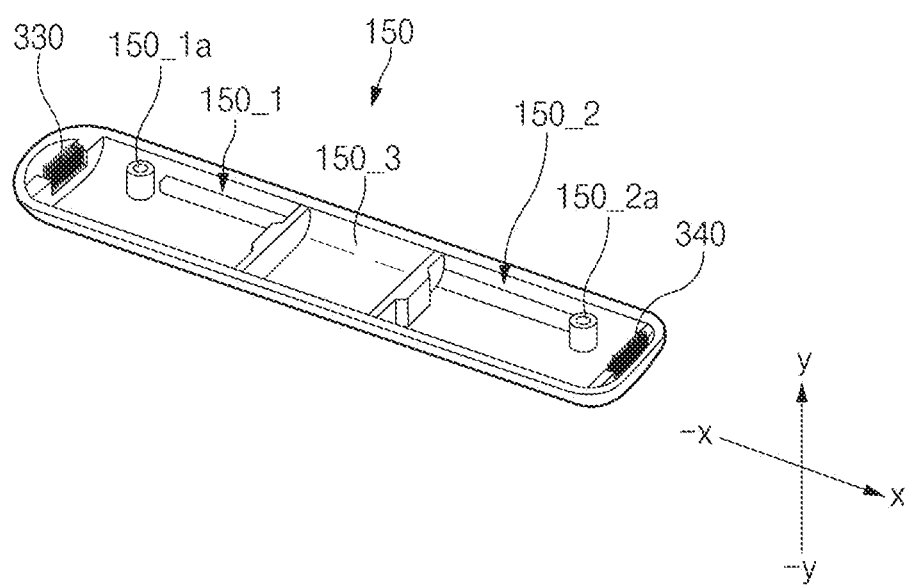
FIG. 6 is a diagram illustrating an example of a hinge housing according to an embodiment of the disclosure.

FIG. 6 is a diagram illustrating an example of a hinge housing according to an embodiment of the disclosure.

Referring to FIG. 6, the hinge housing 150 may include a first hinge seating portion 150_1 on which the first hinge structure 200*a* is seated, and a second hinge seating portion 150_2 on which the second hinge structure 200*b* is seated, and may include an empty space 150_3 disposed between the first hinge seating portion 150_1 and the second hinge seating portion 150_2. At least one first boss 150_1*a* coupled to the first hinge structure 200*a* may be disposed on the first hinge seating portion 150_1, and at least one second boss 150_2*a* coupled to the second hinge structure 200*b* may be disposed on the second hinge seating portion 150_2. After the first hinge structure 200*a* is coupled to the first boss 150_1*a*, the first hinge structure 200*a* may be fixed to the first hinge seating portion 150_1 by a coupling member (e.g., screw). Similarly, after the second hinge structure 200*b* is coupled to the second boss 150_2*a*, the second hinge structure 200*b* may be fixed to the second hinge seating portion 150_2 by a coupling member. The empty space 150_3 may include a space formed by a sidewall disposed in the region of the first hinge seating portion 150_1 and a sidewall disposed in the region of the second hinge seating portion 150_2. In the empty space 150_3, a wire for electrically connecting an electronic element disposed in the first hinge housing 150 and an electronic element disposed in the second hinge housing 150 may be disposed. In this regard, at least a portion of the structure forming the empty space 150_3 may include a passage (hole or groove) such that a wire for connecting the first housing 110 with the second housing 120 may be disposed.

The third dustproof structure 330 may be disposed on one side of the first hinge seating portion 150_1. According to an embodiment of the disclosure, the third dustproof structure 330 may be disposed in the region at least partially overlapped with (or, adjacent to, within a predetermined distance) the region on which the first hinge structure 200*a* is seated, in the space of the first hinge seating portion 150_1. For example, the third dustproof structure 330 may be disposed on an edge of the first hinge seating portion 150_1 in the −x-axis direction. Examples of the third dustproof structure 330 may include a fiber structure arranged in the y-axis direction or a fiber structure arranged in the x-axis direction. At least a portion of the third dustproof structure 330 may further include a structure having elasticity.

The fourth dustproof structure 340 may be disposed on one side of the second hinge seating portion 150_2. According to an embodiment of the disclosure, in the process where the second hinge structure 200*b* is seated on the second hinge seating portion 150_2, the fourth dustproof structure 340 may be disposed in the region at least partially overlapped with (or the region adjacent to, within a predetermined distance) the second hinge structure 200*b*. For example, the fourth dustproof structure 340 may be disposed on an edge of the second hinge seating portion 150_2 in the x-axis direction. Similar to the third dustproof structure 330, the fourth dustproof structure 340 may include a fiber structure arranged in the y-axis direction or a fiber structure arranged in the −x-axis direction. At least a portion of the fourth dustproof structure 340 may further include a structure having elasticity.

Figure 7A:
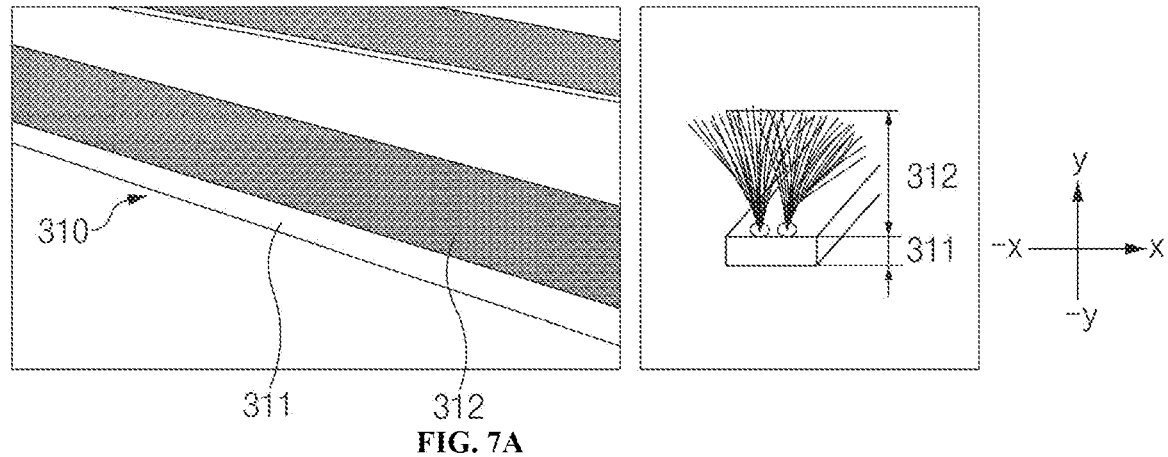
FIG. 7A is a diagram illustrating an example of a dustproof structure according to an embodiment of the disclosure.
Figure 7B:
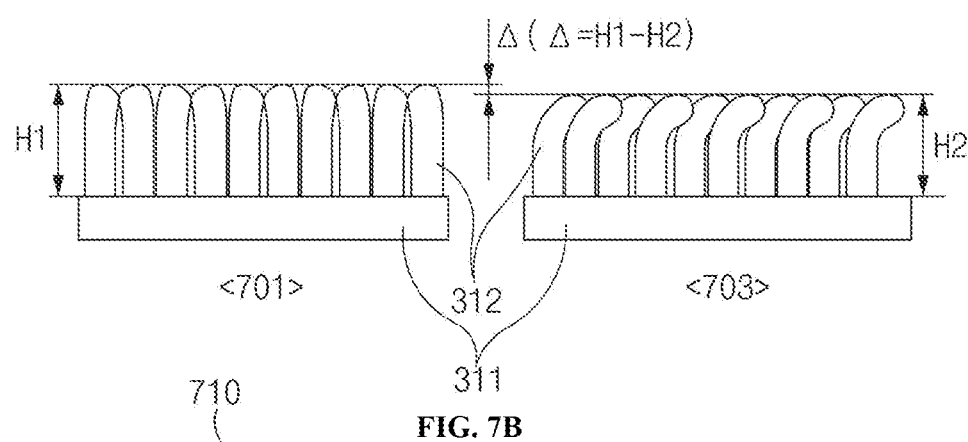
FIG. 7B is another diagram illustrating an example of a dustproof structure according to an embodiment of the disclosure.
Figure 7C:
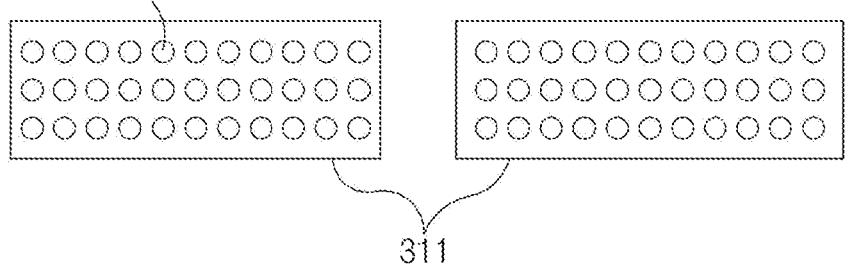
FIG. 7C is another diagram illustrating an example of a dustproof structure according to an embodiment of the disclosure.

FIGS. 7A-7C are diagrams illustrating an example of a dustproof structure according to an embodiment of the disclosure.

Referring to FIGS. 7A-7C, the first dustproof structure 310 (or the second to fourth dustproof structures 320, 330, and 340) may include a fiber portion 312 (or fiber bundle) and a substrate portion 311. The substrate portion 311 may be formed of, for example, plastic, polymer, fiber, or the like in a plate shape having a predetermined thickness. On the substrate portion 311, the fiber portion 312 may be woven and disposed in a predetermined arrangement. The substrate portion 311 may be provided to have a predetermined width and length. For example, the length of the substrate portion 311 may have a length corresponding to the lengths of the first bent portion 115 and the second bent portion 125 formed in the first housing 110 and the second housing 120 in the horizontal direction (e.g., based on FIG. 5, a direction traversing along the −x-axis and the x-axis). The width of the substrate portion 311 may have a size corresponding to a predetermined width of the edges of the first bent portion 115 and the second bent portion 125. According to various embodiments of the disclosure, an adhesive member (e.g., double-sided tape or liquid adhesive material) may be disposed beneath the substrate portion 311 to fix the substrate portion 311 to the first bent portion 115 and the second bent portion 125.

The fiber portion 312 may be composed of a plurality of aggregates including a plurality of fibers, and may include portions in which each aggregate is inserted into a sac or a hole 710 of a predetermined pattern disposed in the substrate portion 311. One aggregate may be inserted and fixed in one sac or hole 710. One aggregate may be composed of a predetermined number of fibers, and overall, respective aggregates may be composed of the same or a similar number of fibers. According to various embodiments of the disclosure, the number of fibers constituting each aggregate may vary depending on the size or shape of the sacs or holes 710, or the pattern arrangement. At least a portion of the lower ends of the aggregates of the fiber portion 312 may be inserted into the substrate portion 311 or may protrude under the substrate portion 311. The pattern of the sacs or holes 710 of the substrate portion 311 into which the aggregates of the fiber portion 312 are inserted and fixed may have various arrangements, for example, a zigzag pattern arrangement, a matrix or lattice arrangement, a mixed form of the lattice arrangement and a zigzag pattern, a random arrangement, and the like. According to an embodiment of the disclosure, the pattern of the sacs or holes 710 may include an uneven pattern.

The aggregates of the fiber portion 312 may be fixed at least partially to the substrate portion 311, and the remaining portions of the aggregates may be arranged upward (in the y-axis direction) based on the upper surface of the substrate portion 311. The lower portions of the aggregates of the fiber portion 312 (e.g., the portion disclosed relatively close to the substrate portion 311) may be assembled to sacs or holes 710 formed on the substrate portion 311 to be inserted and fixed, and the upper portions of the aggregates (portions relatively disposed away from the substrate portion 311) may be arranged at irregular intervals with adjacent fibers. The height of the upper surface of the fiber portion 312 may be formed to have a substantially predetermined height. As the fiber portion 312 is disposed such that the lower portions are assembled to the substrate portion 311 and the upper portions are scattered, the overall shape may be arranged in the shape of an inverted cowl (a wide side faces upward).

The first dustproof structure 310 described above may be disposed to have a predetermined height above the substrate portion 311, as in state 701. Then, if the first dustproof structure 310 is disposed on the first bent portion 115 and the second bent portion 125 and the hinge housing 150 is disposed thereon, at least a portion of the first dustproof structure 310 may have a state in which at least a portion of the upper surface is bent as in state 703 (the fibers of the fiber portion 312 are disposed to be bent by the delta (H1-H2)). Even if the upper portion of the fiber portion 312 of the first dustproof structure 310 is bent as in state 703, the fibers of the fiber portion 312 are entangled with each other, and thus the space between the fibers may be closed, and furthermore, the space between the hinge housing 150 and the first bent portion 115 and the second bent portion 125 may be closed as well. Accordingly, even if the space between the first bent portion 115 and the second bent portion 125 and the hinge housing 150 is deformed by the hinge operation of the hinge housing 150, the space may be closed by the first dustproof structure 310, which makes it possible to prevent foreign matter from being introduced from the outside. The height of the fiber portion 312 may vary depending on the size of the space between the hinge housing 150 and the first bent portion 115 and the second bent portion 125. The number of the fibers constituting the aggregate of the fiber portion 312 may be employed such that the space between fibers is closed by being pressed by the hinge housing 150 after the disposition on the first bent portion 115 and the second bent portion 125. In addition, depending on the thickness (or diameter) of the fibers, the number of fibers constituting one aggregate may vary. Alternatively, even if the hinge operation of the electronic device 100 is performed a predetermined number of times or more (e.g., 20,000 or more), the material, the elasticity, and the diameter of the fibers, which are to maintain the original shape of the fiber portion 312, are determined, and according to the determination, the number of the fibers of the aggregate assembled to one sac or hole 710 may be determined. At least one of various fibers, such as artificial fiber or natural fiber, optical fiber, and glass fiber, may be employed for the fiber of the fiber portion 312, and a mixed fiber may be employed as required.

FIGS. 8A-8D are diagrams illustrating an example of housings to which a dustproof structure is applied in an electronic device according to an embodiment of the disclosure.

Referring to FIGS. 8A-8D, the electronic device 100 may include the first housing 110, the second housing 120, and the hinge housing 150. Additionally, as described above in FIGS. 1A to 5, the electronic device 100 may further include a display, a hinge structure, and at least one device element related to the use of the electronic device.

The first bent portion 115 may be formed on the one side of the first housing 110. As illustrated in FIG. 5, the first bent portion 115 may have a predetermined curvature on one side edge of the first housing 110 and may have an engraved shape. The shape of the first bent portion 115 may have a shape corresponding to at least a portion of the shape of the hinge housing 150. A first end 117_1 (or edge) of the first bent portion 115 (e.g., an end in the −z-axis direction) may be disposed to face a second end 127_1 (or edge) of the second bent portion 125 (e.g., an end in the z-axis direction). The first dustproof structure 310 may be disposed adjacent to the first end 117_1 of the first bent portion 115 facing the second end 127_1 of the second bent portion 125. In this regard, a first structure mounting portion 115a on which the first dustproof structure 310 is to be seated may be formed at the first end 117_1 of the first bent portion 115. The first structure mounting portion 115a may be formed in a stepped shape on the first end 117_1 of the first bent portion 115. The first structure mounting portion 115a is recessed relative to the surroundings, and the recessed shape may have a specified curvature. An adhesive member for fixing the first dustproof structure 310 may be disposed on one surface of the first structure mounting portion 115a.

The second bent portion 125 facing the first bent portion 115 may be formed on one side of the second housing 120. As illustrated in FIG. 5, the second bent portion 125 may have a predetermined curvature on one side edge of the second housing 120 and may have an engraved shape. The shape of the second bent portion 125 may have a shape corresponding to a portion of the shape of the back surface of the hinge housing 150. The second end 127_1 of the second bent portion 125 (e.g., the end in the z-axis direction)

may be disposed to face the first end 117_1 (or edge) of the first bent portion 115 (e.g., the end in the −z-axis direction). Accordingly, if the first end 117_1 of the first bent portion 115 and the second end 127_1 of the second bent portion 125 are arranged to face each other, the shapes of the first bent portion 115 and the second bent portion 125 may correspond to at least a portion of the shape of the hinge housing 150. For example, the shapes of the first bent portion 115 and the second bent portion 125 may be formed to correspond to at least a portion of the shape of the back surface of the hinge housing 150.

The second dustproof structure 320 may be disposed adjacent to the second end 127_1 of the second bent portion 125 facing the first end 117_1 of the first bent portion 115. As the second dustproof structure 320 is positioned at the second end 127_1 of the second bent portion 125, if the first bent portion 115 and the second bent portion 125 are arranged to face each other at least partially, the first dustproof structure 310 and the second dustproof structure 320 may be arranged adjacent to each other and side by side. In this regard, a second structure mounting portion 125a on which the second dustproof structure 320 is to be seated may be formed at the second end 127_1 of the second bent portion 125. The second structure mounting portion 125a may be formed in a stepped shape on the second end 127_1 of the second bent portion 125, similar to the first structure mounting portion 115a. The second structure mounting portion 125a may protrude relative to the surroundings, and the protruding shape may have a specified curvature. The second structure mounting portion 125a may be provided in the same or similar shape as the first structure mounting portion 115a. An adhesive member for fixing the second dustproof structure 320 may be disposed on one surface of the second structure mounting portion 125a.

As illustrated, the back surface of the hinge housing 150 may be disposed on the first dustproof structure 310 and the second dustproof structure 320. When the electronic device 100 is in the unfolded (open) state, one side surface of the first housing 110 (one side where the first bent portion 115 is disposed) and one side surface of the second housing 120 (one side surface on which the second bent portion 125 is disposed) may be disposed to face each other. Accordingly, the fiber portions disposed in the first dustproof structure 310 and the second dustproof structure 320 may be arranged to face in the y-axis direction. The upper ends of the fiber portions of the first dustproof structure 310 and the second dustproof structure 320 may be pressed by the back surface of the hinge housing 150, and accordingly, the fiber portions may be arranged to be bent in a certain direction. When the electronic device 100 is in the unfolded state, the entire upper surfaces (or of a predetermined ratio or more) of the first dustproof structure 310 and the second dustproof structure 320 may have a bent state by the back surface of the hinge housing 150.

When the electronic device 100 is in the folded (closed) state, the back surface of the first housing 110 and the back surface of the second housing 120 may be disposed to face each other. Accordingly, the first dustproof structure 310 may be disposed to face the edge of the hinge housing 150 in the −z-axis direction, and the second dustproof structure 320 may be disposed to face the edge of the hinge housing 150 in the z-axis direction. The first dustproof structure 310 may close the gap between the first housing 110 and the hinge housing 150 and the second dustproof structure 320 may close the gap between the second housing 120 and the hinge housing 150, which makes it possible to prevent foreign matter from being introduced through the gap (or crack) between the first housing 110 and the second housing 120 and the hinge housing 150. As the first dustproof structure 310 faces one side edge of the hinge housing 150, the fiber portion disposed on the upper portion of the first dustproof structure 310 in the y-axis direction may maintain an upright state, and the fiber portion disposed on the lower portion of the first dustproof structure 310 in the y-axis direction may have a bent state. The upper and lower disposition states of the second dustproof structure 320 may be the same as the states of the first dustproof structure 310. In the first dustproof structure 310 and the second dustproof structure 320, the numbers of the fibers disposed or the densities per unit area (or densities per predetermined area) of the aggregate may be the same as or similar to each other. According to various embodiments of the disclosure, the densities of the aggregates disposed in the first dustproof structure 310 and the second dustproof structure 320 may be formed differently depending on the position. For example, the closer to the first end 117_1 of the first bent portion 115, the greater the density of the first dustproof structure 310. Alternatively, the closer to the first end 117_1 of the first bent portion 115, the smaller the density of the first dustproof structure 310.

FIGS. 9A-9D are diagrams illustrating an example of housings to which a dustproof structure is applied in an electronic device according to an embodiment of the disclosure.

Referring to FIGS. 9A-9D, the electronic device 100 may include the first housing 110, the second housing 120, and the hinge housing 150. Additionally, as described above in FIGS. 1A to 5, the electronic device 100 may further include a display, a hinge structure, and at least one device element related to the use of the electronic device.

The first bent portion 115 may be formed on the one side of the first housing 110. The first bent portion 115 may have a predetermined curvature on one side edge of the first housing 110 and may have an engraved shape; however, at least a portion of the shape of the first bent portion 115 may have a shape corresponding to at least a portion of the shape of the back surface of the hinge housing 150. A third end 117_2 (or edge) of the first bent portion 115 (e.g., an end in the −z-axis direction) may be disposed to face a fourth end 127_2 (or edge) of the second bent portion 125 (e.g., an end in the z-axis direction). The first dustproof structure 310 may be disposed adjacent to the third end 117_2 of the first bent portion 115 facing the fourth end 127_2 of the second bent portion 125. The third end 117_2 of the first bent portion 115 may include a first rail protrusion 116 protruding in the y-axis direction from the −y-axis direction. The first rail protrusion 116 may be formed to correspond to the longitudinal direction of the first dustproof structure 310 (e.g., a direction traversing along the x-axis to −x-axis direction). A third structure mounting portion 115b on which the first dustproof structure 310 is to be seated may be formed at the third end 117_2 of the first bent portion 115 adjacent to the first rail protrusion 116. The third structure mounting portion 115b may have a rail groove shape engraved in the −Y-axis direction at the third end 117_2. The third structure mounting portion 115b may be formed along the longitudinal direction of the first rail protrusion 116. An adhesive member (or adhesive tape, adhesive material) may be disposed between the first dustproof structure 310 and the bottom surface of the rail groove of the third structure mounting portion 115b. At least a portion of the outer end of the third end 117_2 and the first rail protrusion 116 may be rounded.

The second bent portion 125 may be formed on the one side of the second housing 120. The second bent portion 125 may be opposite to the first bent portion 115 described above in structure, and if the third end 117_2 of the first bent portion 115 and the fourth end 127_2 of the second bent portion 125 are arranged to face each other, at least a portion of the shape formed by the first bent portion 115 and the second bent portion 125 may be formed to correspond to at least a portion of the back surface of the hinge housing 150. The fourth end 127_2 of the second bent portion 125 may include a second rail protrusion 126 protruding in the y-axis direction from the −y-axis direction. The second rail protrusion 126 may be formed in a shape similar to the first rail protrusion 116. A fourth structure mounting portion 125b on which the second dustproof structure 320 is to be seated may be formed at the fourth end 127_2 of the second bent portion 125 adjacent to the second rail protrusion 126. The fourth structure mounting portion 125b may have a rail groove shape engraved in the −Y-axis direction at the fourth end 127_2. An adhesive member (or adhesive tape, adhesive material) may be disposed between the second dustproof structure 320 and the bottom surface of the rail groove of the fourth structure mounting portion 125b. At least a portion of the outer end of the fourth end 127_2 and the second rail protrusion 126 may be rounded.

When the electronic device 100 is in the unfolded (open) state, the third end 117_2 and the fourth end 127_2 may be arranged to face each other, and accordingly, the rounded outer end of the third end 117_2 and the rounded outer end of the fourth end 127_2 face each other to form a rounded groove of a predetermined depth in the y-axis direction. The groove rounded in the y-axis direction may prevent flesh from being caught between the first housing 110 and the second housing 120 in the gripping process of the electronic device 100. As the third structure mounting portion 115b and the fourth structure mounting portion 125b are formed flat, the fiber portions of the first dustproof structure 310 disposed at the third structure mounting portion 115b and the second dustproof structure 320 disposed at the fourth structure mounting portion 125b may be upright (standing) side by side in the y-axis direction, and may be disposed to be at least partially bent uniformly by the back surface of the hinge housing 150.

When the electronic device 100 is in the folded (closed) state, the third end 117_2 may be disposed adjacent to the edge of the hinge housing 150 in the −z-axis direction. Accordingly, a first portion 310a of the first dustproof structure 310 disposed at the third end 117_2 may maintain the upright state inside the electronic device 100, and a second portion 310b of the first dustproof structure 310 may be disposed to be bent by facing the hinge housing 150. In this case, due to the first rail protrusion 116, the second portion 310b may be disposed to be bent in the y-axis direction. In the folded state, as the first rail protrusion 116 is disposed below the first dustproof structure 310 in the −y-axis direction, the first dustproof structure 310 may be prevented from being at least partially observed through the gap between the first housing 110 and the hinge housing 150. According to various embodiments of the disclosure, the aggregate density of the fibers disposed in the first portion 310a and the aggregate density of the fibers disposed in the second portion 310b may be different from each other. For example, the aggregate density of the fibers disposed on the second portion 310b may be formed to be higher than the aggregate density of the fibers disposed in the first portion 310a, whereby it is possible to more firmly block the introduction of outside foreign matter into the electronic device 100. According to various embodiments of the disclosure, the densities of the first portion 310a and the second portion 310b of the first dustproof structure 310 are the same, but the fibers disposed on the second portion 310b push the fibers disposed on the first portion 310a by the pressing of the hinge housing 150, and the density of the fibers disposed on the first portion 310a may be increased accordingly. According to various embodiments of the disclosure, at least a portion of the first portion 310a of the first dustproof structure 310 may maintain the upright state, and thus may serve to support the second portion 310b. In the second portion 310b of the first dustproof structure 310, since the arrangement form is changed by the hinge housing 150 and the density of the fibers in a predetermined space is increased, the second portion 310b may serve to firmly block the gap between the hinge housing 150 and the first housing 110.

When the electronic device 100 is in the folded (closed) state, the fourth end 127_2 may be disposed adjacent to the edge of the hinge housing 150 in the z-axis direction. Accordingly, a third portion 320a of the second dustproof structure 320 disposed at the fourth end 127_2 may maintain the upright state inside the electronic device 100, and a fourth portion 320b of the second dustproof structure 320 may be disposed to be bent by facing the hinge housing 150. The second dustproof structure 320 may be disposed in a similar or identical state to the first dustproof structure 310, and at least a portion of the second dustproof structure may be covered so as not to be observed from the outside by the second rail protrusion 126. According to various embodiments of the disclosure, the aggregate density of the fibers disposed in the first portion 310a and the aggregate density of the fibers disposed in the second portion 310b may be different from each other. For example, the aggregate density of the fibers disposed on the second portion 310b may be formed to be higher than the aggregate density of the fibers disposed in the first portion 310a, whereby it is possible to more firmly block the introduction of outside foreign matter into the electronic device 100. Similar to the first dustproof structure 310, the second dustproof structure 320 may serve to support the fourth portion 320b while the third portion 320a maintains the upright state and the arrangement form of the fourth portion 320b is being changed. In the fourth portion 320b, the arrangement form may be changed by the contact with the hinge housing 150, and the density in a certain space may be increased accordingly, whereby it is possible to firmly block the gap between the hinge housing 150 and the second housing 120.

According to various embodiments of the disclosure, the aggregate density of the fibers disposed in the third portion 320a and the aggregate density of the fibers disposed in the fourth portion 320b may be different from each other. For example, similar to the first dustproof structure 310, the aggregate density of the fibers disposed in the fourth portion 320b may be formed to be higher than the aggregate density of the fibers disposed in the third portion 320a. Alternatively, the densities of the third portion 320a and the fourth portion 320b of the second dustproof structure 320 are the same, but the fibers disposed on the fourth portion 320b push the fibers disposed on the third portion 320a by the pressing of the hinge housing 150, and the density of the fibers disposed on the second upper portion 310a may be increased accordingly.

Figure 10A:
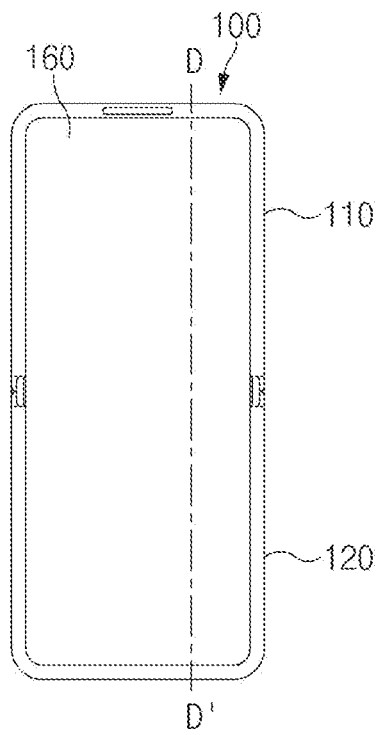
FIG. 10A is a diagram illustrating at least a portion of a cut surface configuration of a part of an electronic device to which a dustproof structure is applied, according to an embodiment of the disclosure.
Figure 10B:
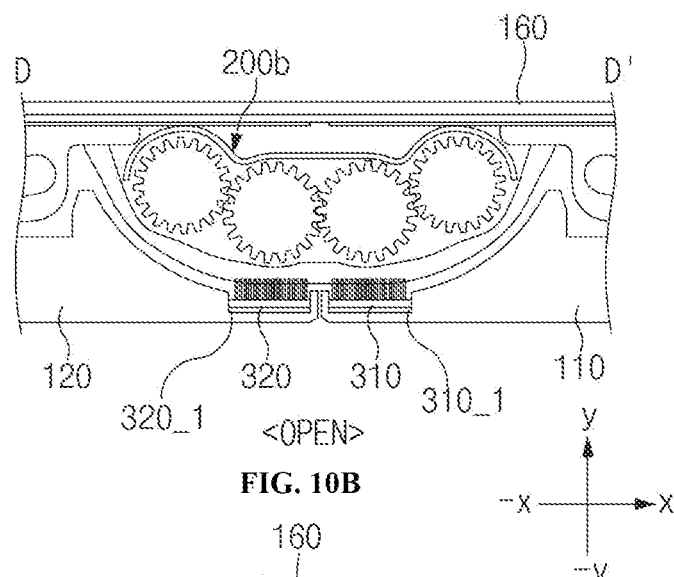
FIG. 10B is another diagram illustrating at least a portion of a cut surface configuration of a part of an electronic device to which a dustproof structure is applied, according to an embodiment of the disclosure.
Figure 10C:
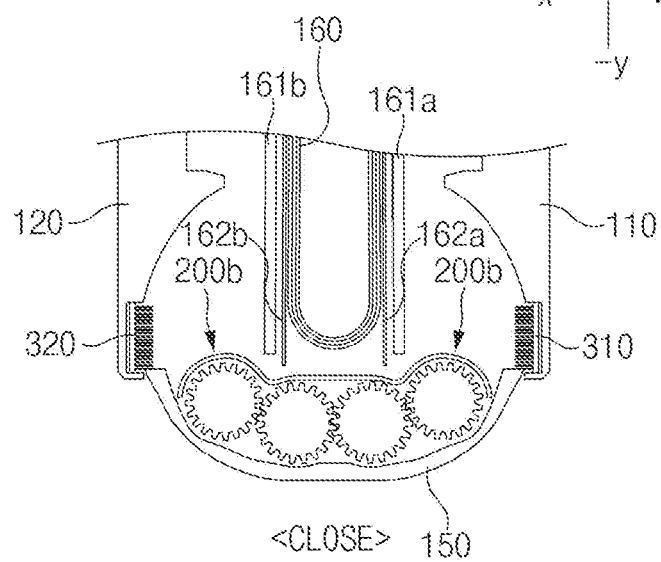
FIG. 10C is another diagram illustrating at least a portion of a cut surface configuration of a part of an electronic device to which a dustproof structure is applied, according to an embodiment of the disclosure.
Figure 11A:
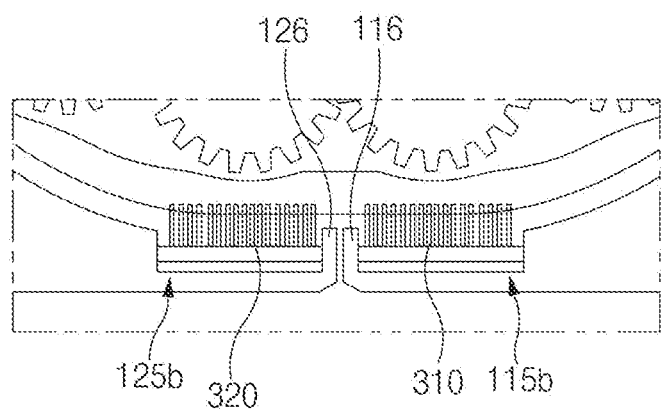
FIG. 11A is a diagram illustrating a portion in which the dustproof structure, according to an embodiment of the disclosure.
Figure 11B:
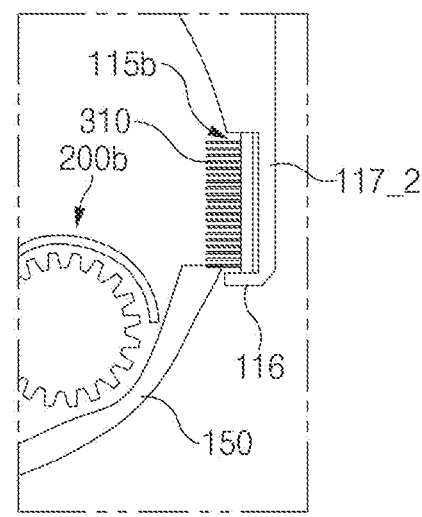
FIG. 11B is another diagram illustrating a portion in which the dustproof structure, according to an embodiment of the disclosure.

FIGS. 10A-10C are diagrams illustrating at least a portion of a cut surface configuration of a part of an electronic device to which a dustproof structure is applied, according to an embodiment of the disclosure, and FIGS. 11A-11B are diagrams illustrating a portion in which the dustproof structure is disposed in the cut surface of FIGS. 10A-10C according to an embodiment of the disclosure.

Referring to FIGS. 10A-10C and 11A-11B, the electronic device 100 may include the first housing 110, the second housing 120, the hinge housing 150, the second hinge structure 200b (or the first hinge structure), the display 160, the first dustproof structure 310, and the second dustproof structure 320. In the illustrated drawing, the second hinge structure 200b is shown in the cross-section by cutting one side of the electronic device 100, and the first hinge structure may be shown in the cross-section depending on the cutting position. According to various embodiments of the disclosure, the electronic device 100 may further include at least one of a first adhesive member 310_1 disposed between the first dustproof structure 310 and the first housing 110 and a second adhesive member 320_1 disposed between the second dustproof structure 320 and the second housing 120.

When the electronic device 100 is in the unfolded (open) state, the display 160 may have a flat state as a whole. The second hinge structure 200b may be disposed under the display 160. The second hinge structure 200b may be seated in the hinge housing 150. The hinge housing 150 may be disposed to be covered by one side edge of the first housing 110 and one side edge of the second housing 120. The first dustproof structure 310 may be disposed on one side edge of the first housing 110 as described above in FIGS. 9A-9D. The second dustproof structure 320 may be disposed on one side edge of the second housing 120 as described above in FIGS. 9A-9D. The first housing 110 may include the third structure mounting portion 115b on which the first dustproof structure 310 is mounted and the first rail protrusion 116, and the second housing 120 may include the fourth structure mounting portion 125b on which the second dustproof structure 320 is mounted and the second rail protrusion 126. The widths of the first rail protrusion 116 and the second rail protrusion 126 may be, for example, 1 mm to 0.05 mm (e.g., 0.25 mm) The widths of the first rail protrusion 116 and the second rail protrusion 126 may vary depending on the size of the electronic device 100. The heights of the first rail protrusion 116 and the second rail protrusion 126 may be formed to be lower than the heights of the first dustproof structure 310 and the second dustproof structure 320 based on the y-axis.

When the electronic device 100 is in the folded (closed) state, the display 160 may have a state of being folded at the center portion. The first support member 161a and the second support member 161b disposed under the display 160 to support the display 160 may be separated, and may be arranged in a state of being upright in the y-axis direction. The first dustproof structure 310 may be disposed to face one side edge (the edge in the x-axis direction) of the hinge housing 150, and the second dustproof structure 320 may be disposed to face the other side edge (the edge in the −x-axis direction) of the hinge housing 150. Accordingly, some of the fiber portions of the first dustproof structure 310 may maintain the upright state, and the others may be disposed to be bent while facing one side edge of the hinge housing 150. Some of the fiber portions of the second dustproof structure 320 may maintain the upright state, and the others may be disposed to be bent while facing one side edge of the hinge housing 150. The width of the first dustproof structure 310 or the second dustproof structure 320 that is disposed to be bent may be, for example, 0.2 mm or more. The width of the first dustproof structure 310 or the second dustproof structure 320 may vary depending on the size of the electronic device 100 or the size of the gap between the first housing 110 and the second housing 120 and the hinge housing 150. Alternatively, the width of the first dustproof structure 310 or the second dustproof structure 320 may vary depending on the material or the upright length from the substrate portion of the dustproof structure.

According to various embodiments of the disclosure, a first display protective member 162a for protecting the display 160 and maintaining flatness may be disposed between the display 160 and the first support member 161a. Similarly, a second display protective member 162b for protecting the display 160 and maintaining flatness may be disposed between the display 160 and the second support member 161b. The first support member 161a and the first display protective member 162a may be formed in one configuration. Similarly, the second support member 161b and the second display protective member 162b may also be formed in one configuration.

Figure 12:
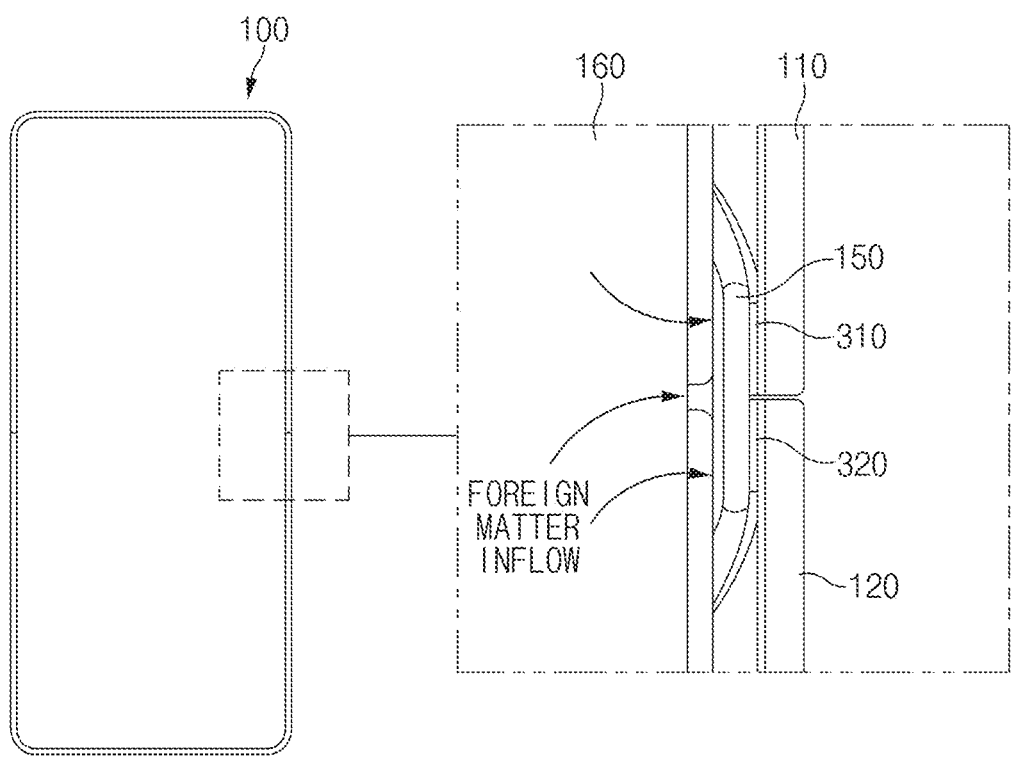
FIG. 12 is a diagram illustrating an example of a form of foreign matter inflow in a foldable electronic device according to an embodiment of the disclosure.
Figures 13A, 13B:
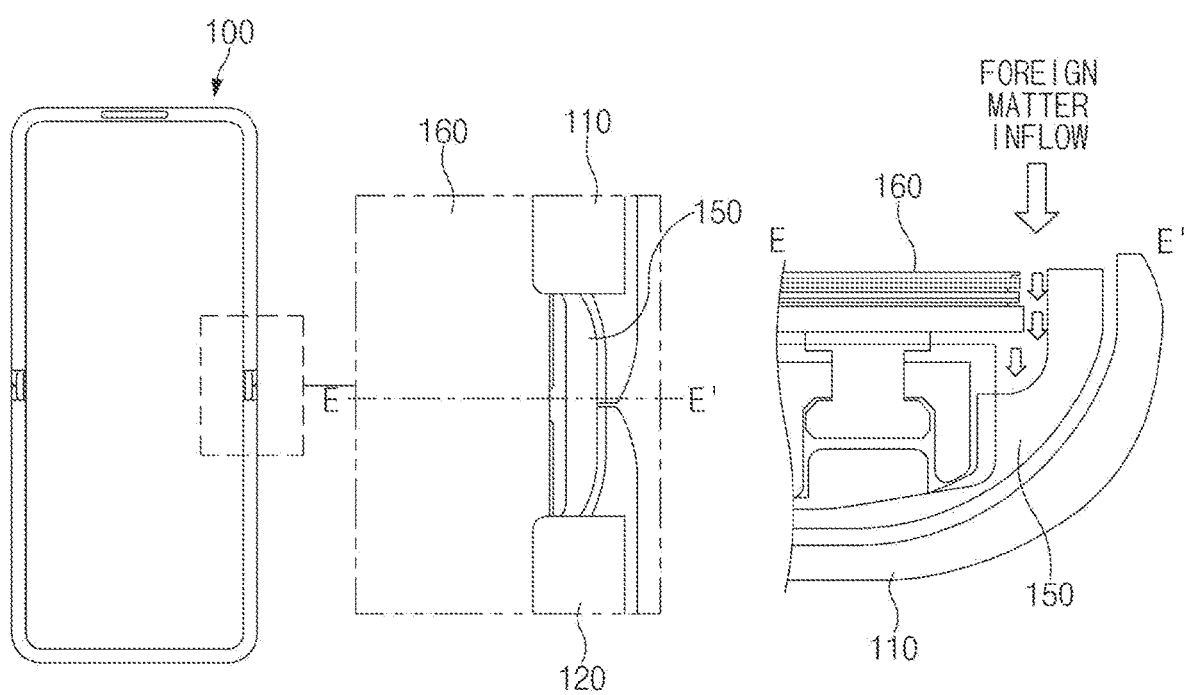
FIG. 13A is a diagram illustrating a portion of a cross-section for describing a form of foreign matter inflow in a foldable electronic device according to an embodiment of the disclosure.
FIG. 13B is another diagram illustrating a portion of a cross-section for describing a form of foreign matter inflow in a foldable electronic device according to an embodiment of the disclosure.

FIG. 12 is a diagram illustrating an example of a foreign matter inflow in a foldable electronic device according to an embodiment of the disclosure, and FIGS. 13A-13B is a diagram illustrating a portion of a cross-section for describing a foreign matter inflow in a foldable electronic device according to an embodiment of the disclosure.

Referring to FIGS. 12 and 13A-13B, the electronic device 100 may have a passage through which foreign matter is to be introduced at one side edge of the folded portion. For example, as described above, the gap between the hinge housing 150 and the first housing 110 and the second housing 120 is blocked using the first dustproof structure 310 and the second dustproof structure 320, whereby it is possible to block foreign matter through the gap between the hinge housing 150 and the first housing 110 and the second housing 120. On the other hand, in the process of placing the display 160 on the hinge housing 150, in order to allow the display 160 to be folded, the display 160 may be disposed in a substantially non-adhesive state to the upper surface of the hinge housing 150. Accordingly, foreign matter may be introduced through the gaps between both side edges of the center portion of the display 160 and the hinge housing 150 (or the hinge housing 150 and surrounding structures (e.g., the first support member 161a, the second support member 161b, and the display 160). Such foreign matter inflow passages may be blocked by the dustproof structures described in FIGS. 14 to 16.

Figure 14:
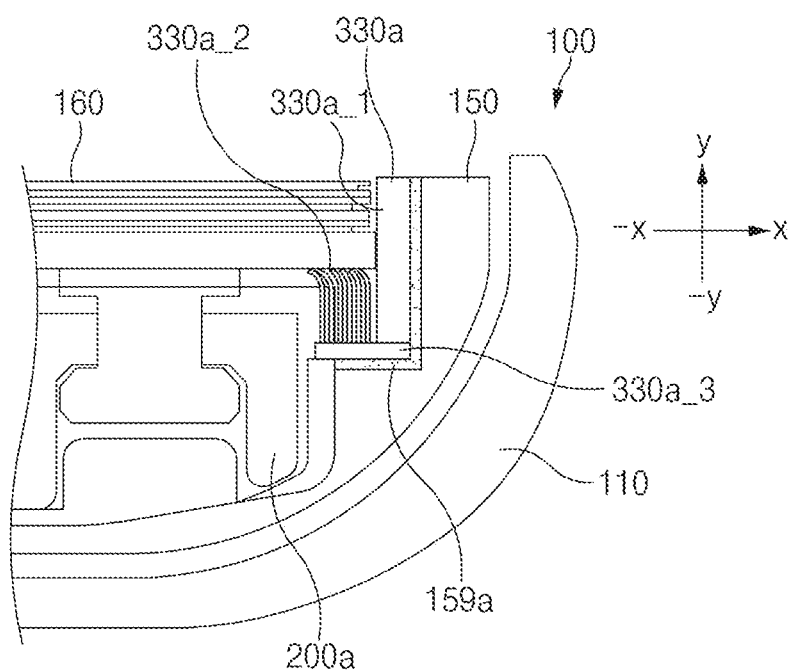
FIG. 14 is a diagram illustrating an example of a dustproof structure disposed inside a hinge housing according to an embodiment of the disclosure.

FIG. 14 is a diagram illustrating an example of a dustproof structure disposed inside a hinge housing according to an embodiment of the disclosure.

Referring to FIG. 14, it is a cross-sectional view taken along cutting line E-E' in FIGS. 13A-13B, illustrating a state in which a first side dustproof structure 330a according to an embodiment of the disclosure is disposed. The first side dustproof structure 330a may include at least one of the third dustproof structure 330 and the fourth dustproof structure 340 arranged on both side edges of the hinge housing 150 described in FIG. 6.

The first side dustproof structure 330a may include a first portion 330a_1 at least partially facing or contacting the inside of the hinge housing 150, and a second portion 330a_2 at least partially contacting or facing one side of the display 160 (or as another structure including the display 160, the support members or protective members described above in FIGS. 11A-11B, or at least a portion of the housing). According to various embodiments of the disclosure, at least some other of the first portion 330a_1 may face or contact the display 160. According to various embodiments of the disclosure, at least some other of the second portion 330a_2 may not be in contact with the display 160 and may be disposed in an empty space.

The first portion 330a_1 may be disposed to have a predetermined thickness and width, be upright from the substrate portion 330a_3, and contact the sidewall of the hinge housing 150. The first portion 330a_1 may include, for example, a cushion having elastic force. The second portion 330a_2 may be composed of at least one aggregate including fibers applied to the dustproof structures described above in FIGS. 5 to 11. The first portion 330a_1 and the second portion 330a_2 may be disposed on one side of the hinge housing 150 to be upright in the y-axis direction, and the second portion 330a_2 may be disposed to be bent in the −x-axis direction or the x-axis direction depending on the disposition of the display 160. The y-axis height of the first portion 330a_1 and the y-axis height of the second portion 330a_2 may be the same, or the y-axis height of the second portion 330a_2 may be lower than the y-axis height of the first portion 330a_1.

According to various embodiments of the disclosure, an adhesive member 159a may be disposed between the first side dustproof structure 330a and the inner surface of the hinge housing 150. The adhesive member 159a may disposed either between the first portion 330a_1 and the hinge housing 150 or between the substrate portion 330a_3 on which the first portion 330a_1 and the second portion 330a_2 are seated and the bottom surface of the hinge housing. With the above-mentioned configuration, primarily, the first portion 330a_1 may serve to block the gap between the display 160 and the hinge housing 150, and secondly, the second portion 330a_2 may serve to block the gap between the display 160 and the hinge housing 150, whereby it is possible to block the foreign matter inflow.

According to various embodiments of the disclosure, the fiber density of each part of the first side dustproof structure 330a may be different. For example, the density of fibers of the second portion 330a_2 disposed close to the first portion 330a_1 may be formed to be relatively high, and the density of fibers of the second portion 330a_2 away from the first portion 330a_1 may be formed to be relatively low. Accordingly, the foreign matter inflow through the gap between the display 160 and the hinge housing 150 may be more firmly blocked.

Figures 15A, 15B:
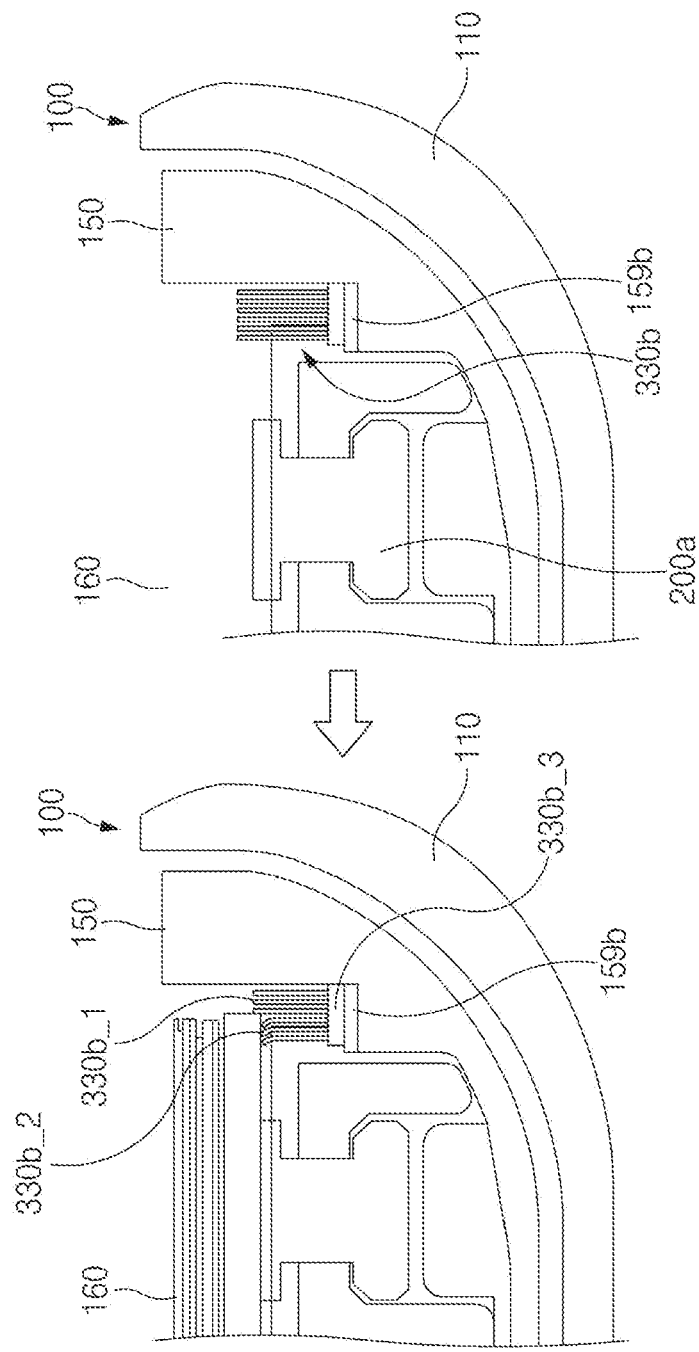
FIG. 15A is a diagram illustrating another example of a dustproof structure disposed inside a hinge housing according to an embodiment of the disclosure.
FIG. 15B is another diagram illustrating another example of a dustproof structure disposed inside a hinge housing according to an embodiment of the disclosure.

FIGS. 15A-15B are diagrams illustrating another example of a dustproof structure disposed inside a hinge housing according to an embodiment of the disclosure.

Referring to FIGS. 15A-15B, similar to the drawing illustrated in FIG. 14, the electronic device 100 may include the display 160 (or a structure including the display 160), the hinge housing 150, the first housing 110 (or the second housing), the first hinge structure 200a (or the second hinge structure 200b), and a second side dustproof structure 330b. The above-mentioned display 160, the hinge housing 150, the first housing 110, and the first hinge structure 200a may correspond to components described above in FIGS. 1A to 11B, respectively. The second side dustproof structure 330b may be at least one of the third dustproof structure 330 and the fourth dustproof structure 340 described above. According to various embodiments of the disclosure, the electronic device 100 may further include an adhesive member 159b disposed between the second side dustproof structure 330b and the hinge housing 150.

The second side dustproof structure 330b may include a structure including aggregates of the same fibers. The second side dustproof structure 330b may include a third portion 330b_1 disposed adjacent to the display 160 without being overlapped with the display 160 in the vertical direction (e.g., the y-axis to −y-axis direction), a fourth portion 330b_2 at least partially overlapped with the display 160 in the vertical direction, and a substrate portion 330b_3. The third portion 330b-1 and the fourth portion 330b_2 may include aggregates of substantially the same fibers. The third portion 330b_1 may be pushed toward the sidewall of the hinge housing 150 by the display 160, and thus may have a higher arrangement density of the aggregates than that of the fourth portion 330b_2. The fourth portion 330b_2 may contact the back surface of the display 160 (or the back surface of the structure including the display 160), and thus may be disposed to be bent in a specific direction. An adhesive layer may be further disposed between the substrate portion 330b_3 and at least a portion of the inner surface of the hinge housing 150. According to various embodiments of the disclosure, the fiber density of each part of the second side dustproof structure 330b may be different. For example, the density of the fibers disposed in the third portion 330b_1 may be formed to be higher than the density of the fibers disposed in the fourth portion 330b_2. Alternatively, in the second side dustproof structure 330c in which the density of the fibers is the same, the third portion 330b_1 may be pressed by at least a portion of structures including the display 160, thereby making the arrangement density of the fibers increased toward the fourth portion 330b_2.

Figure 16:
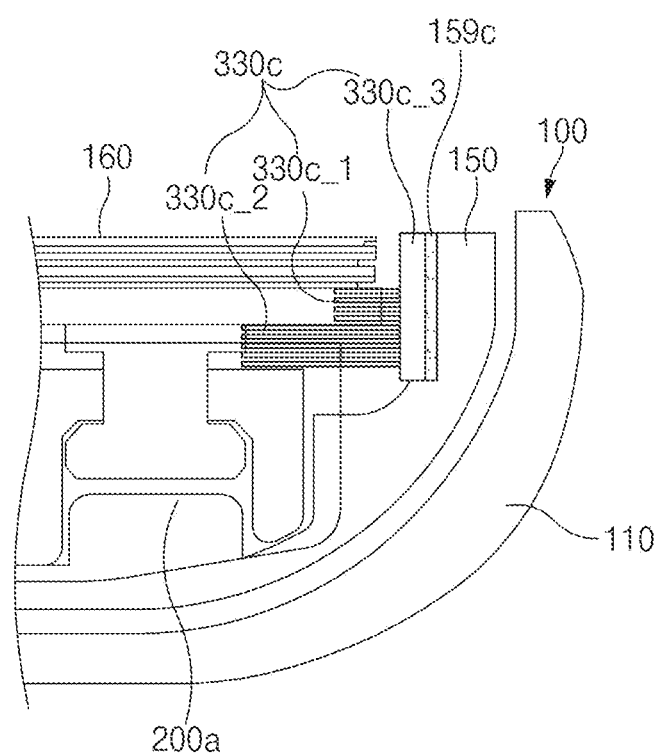
FIG. 16 is a diagram illustrating still another example of a dustproof structure disposed inside a hinge housing according to an embodiment of the disclosure.

FIG. 16 is a diagram illustrating still another example of a dustproof structure disposed inside a hinge housing according to an embodiment of the disclosure.

Referring to FIG. 16, the electronic device 100 according to an embodiment of the disclosure may have a configuration similar to FIG. 14 except for the third side dustproof structure 330c. For example, similar to the drawing illustrated in FIG. 14, the electronic device 100 may include the display 160 (or a structure including the display 160), the hinge housing 150, the first housing 110 (or the second housing), and the first hinge structure 200a (or the second hinge structure 200b), and may include the third side dustproof structure 330c. The above-mentioned display 160, the hinge housing 150, the first housing 110, and the first hinge structure 200a may correspond to components described above in FIGS. 1A to 11B, respectively. According to various embodiments of the disclosure, the electronic device 100 may further include an adhesive member 159c disposed between the third side dustproof structure 330c and the hinge housing 150.

The third side dustproof structure 330c may include a structure including aggregates of the same fibers extending in the x-axis to −x-axis direction (aligned in the horizontal direction). The third side dustproof structure 330c may include a substrate portion 330c_3 disposed adjacent to the hinge housing 150, and a fifth portion 330c_1 and a sixth portion 330c_2 disposed on one surface of the substrate portion 330c_3 in the −x-axis or x-axis direction. The fifth portion 330c_1 may be disposed under the display 160 to primarily close the space between the display 160 and the inner surface of the hinge housing 150. The sixth portion 330c_2 may be disposed in the −x-axis direction and under the fifth portion 330c_1 based on the y-axis to contact at least a portion of the device elements of the electronic device 100 or the housing. The length of the fibers of the fifth portion 330c_1 (or the length of the aggregates) may be shorter than the length of the fibers of the sixth portion 330c_2. In the illustrated drawing, the thickness of the fifth portion 330c_1 may be formed to be similar to the thickness of the display 160 (or the thickness including at least a portion of some structures including the display 160). The sixth portion 330c_2 may be disposed to face at least a portion of the hinge structure 200a, and may be provided to have a length that does not affect the hinge operation of the hinge structure 200a. According to various embodiments of the disclosure, the fiber density of each part of the third side dustproof structure 330c may be different. For example, the density of the fibers disposed in the fifth portion 330c_1 may be formed to be higher than the density of the fibers disposed in the sixth portion 330c_2. Alternatively, in the second side dustproof structure 330c in which the density of the fibers is the same, the fifth portion 330c_1 may be pressed by at least a portion of structures including the display 160, thereby making the arrangement density of the fibers increased toward the sixth portion 330c_2.

In FIGS. 5 to 11B, it has been described that the dustproof structures are formed in the first housing 110 and the second housing 120, respectively; however, the disclosure is not limited thereto. In addition, FIGS. 14 to 16 have illustrated that the dustproof structure is partially disposed inside the hinge housing; however, according to various embodiments of the disclosure, at least one of the first to fourth dustproof structures 310, 320, 330, and 340 may be disposed on at least one of the first bent portion 115, the second bent portion 125, one side edge of the hinge housing 150, and the other side edge of the hinge housing 150, as required. Accordingly, the electronic device 100 according to an embodiment of the disclosure may include only one dustproof structure (e.g., the first dustproof structure 310), or the electronic device 100 may include all of a plurality of dustproof structures. According to various embodiments of the disclosure, fibers of at least one of the first to fourth dustproof structures 310, 320, 330, and 340 and the first to third side dustproof structures 330a, 330b, and 330c may be fluorinated-coated. By the fluorinated coating, it is possible to prevent moisture, water, or liquids from being introduced into the electronic device 100 from the outside of the hinge housing 150.

Figures 17A, 17B:
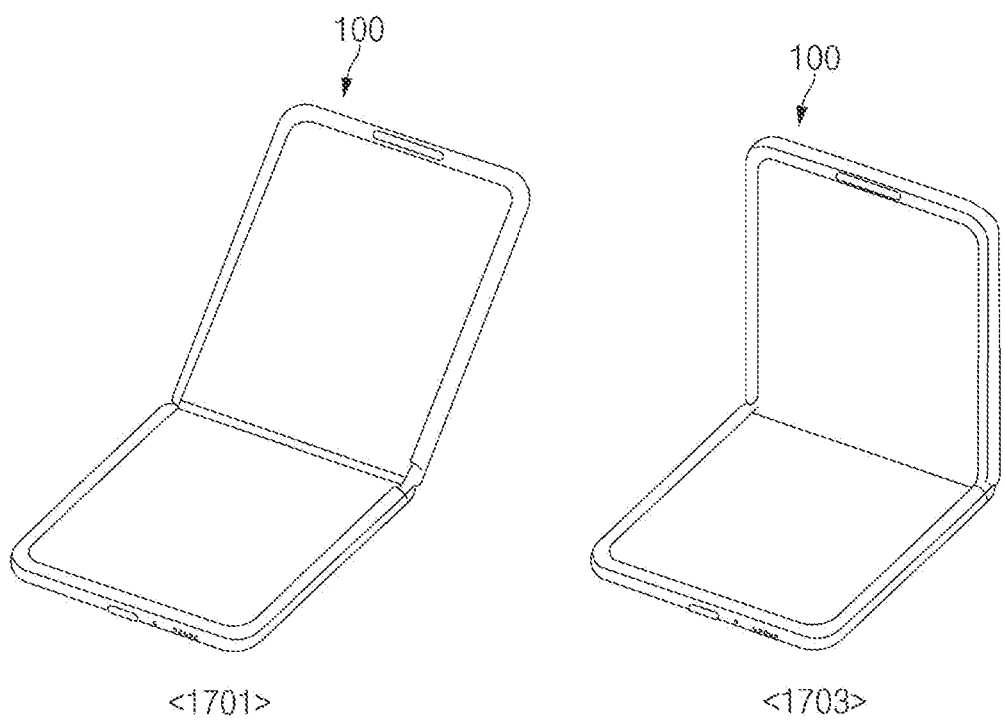
FIG. 17A is a diagram illustrating an example of a free stop state of an electronic device according to an embodiment of the disclosure.
FIG. 17B is another diagram illustrating an example of a free stop state of an electronic device according to an embodiment of the disclosure.

FIG. 17A-17B are diagrams illustrating an example of a free stop state of an electronic device according to an embodiment of the disclosure.

Referring to FIGS. 17A-17B, the electronic device 100 to which at least one of the first to fourth dustproof structures 310, 320, 330, and 340 and the first to third side dustproof structures 330a, 330b, and 330c, which have been described above, is applied may have a free stop function. For example, if the first housing 110 and the second housing 120 are arranged at specified angles as in state 1701 or state 1703, at least a portion of at least one dustproof structure comes into contact with the first housing 110 and the second housing 120, and thus the first housing 110 and the second housing 120 may maintain specified angular states based on friction with at least a portion of the at least one dustproof structure. In the illustrated drawing, state 1701 or state 1703 is illustrated as being in 120 degrees or 90 degrees; the disclosure is not limited thereto. For example, since at least a portion of at least one dustproof structure maintains a state of being in continuous contact with the first housing 110 and the second housing 120, the first housing 110 and the second housing 120 may be mounted at any of various angles from 0 degrees to 180 degrees (free stop function) based on friction with at least a portion of at least one dustproof structure.

According to various embodiments of the disclosure, an electronic device 100 may include a first housing 110, a second housing 120, a hinge housing 150 disposed between the first housing and the second housing, and a flexible display 160 at least partially disposed on the first housing and the second housing, and the first housing and the second housing may perform a folding or unfolding operation based on the center of the hinge housing 150 and may include at least one fiber structure 310 or 320 disposed on at least a portion of one side of the first housing which is overlapped with (or adjacent to, within a predetermined distance) the hinge housing.

According to various embodiments of the disclosure, the at least one fiber structure may include a first dustproof structure 310 disposed with a predetermined length in an axial direction of the hinge housing.

According to various embodiments of the disclosure, the first housing may include a first bent portion 115 provided on one side edge thereof and formed to be bent with a predetermined curvature.

According to various embodiments of the disclosure, the first dustproof structure may be disposed along one side edge of the first bent portion.

According to various embodiments of the disclosure, the electronic device may further include an adhesive member 159a disposed between the first dustproof structure and the first bent portion of the first housing.

According to various embodiments of the disclosure, the adhesive member may include a double-side tape.

According to various embodiments of the disclosure, the first dustproof structure may include a first portion 310a that is overlapped with (or is adjacent to, within a predetermined distance, or contacts) the hinge housing when the electronic device is in a folded state, and a second portion 310b that is not overlapped with (or does not contact) the hinge housing.

According to various embodiments of the disclosure, the second portion may have a larger area than the first portion.

According to various embodiments of the disclosure, a density of fibers disposed on the first portion may be higher than a density of fibers disposed on the second portion.

According to various embodiments of the disclosure, the at least one fiber structure may include a substrate portion 311 including a plurality of holes, and fiber bundles 312 disposed in the plurality of holes of the substrate portion.

According to various embodiments of the disclosure, the plurality of holes may be arranged in a zigzag manner.

According to various embodiments of the disclosure, the second housing may include a second bent portion 125 provided on one side edge thereof and formed to be bent with a predetermined curvature.

According to various embodiments of the disclosure, the at least one fiber structure may include a second dustproof structure 320 disposed along one side edge of the second bent portion.

According to various embodiments of the disclosure, the electronic device may further include an adhesive member 159a disposed between the second dustproof structure and the second bent portion of the second housing.

According to various embodiments of the disclosure, the at least one fiber structure may further include a third dustproof structure 330 provided on one side edge of the hinge housing.

According to various embodiments of the disclosure, the third dustproof structure may include a first portion 330b_1 maintaining an upright state without being overlapped with (or contacting) at least a portion of structures including the display (or maintaining the upright state while facing a portion of the structures), and a second portion 330b_2 pressed by the at least a portion of structures including the display.

According to various embodiments of the disclosure, the third dustproof structure may be formed such that a density of the first portion 330b_1 is higher than a density of the second portion 330b_2.

According to various embodiments of the disclosure, the at least one fiber structure may further include a fourth dustproof structure 340 provided on the other side edge of the hinge housing.

According to various embodiments of the disclosure, the fourth dustproof structure may include a first portion 330c_1 placed side by side with the display; and a second portion 330c_2 placed side by side with the display and including fibers longer than fibers of the first portion.

According to various embodiments of the disclosure, the fourth dustproof structure may be formed such that a density of the first portion 330c_1 is higher than a density of the second portion 330c_2.

Each component (e.g., module or program) according to various embodiments may be made up of a singular or a plurality of entities, and some of the aforementioned sub-components may be omitted, or other sub-components may be further included in various embodiments. Alternatively or additionally, some components (e.g., modules or programs) may be integrated into one entity, performing the same or similar functions performed by respective corresponding components before integration. According to various embodiments, operations performed by a module, program, or another component may be sequentially, parallelly, repeatedly, or heuristically executed, at least some operations may be executed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing;
   a hinge housing disposed between the first housing and the second housing; and
   a flexible display at least partially disposed on the first housing and the second housing,
   wherein the first housing and the second housing:
      perform a folding or unfolding operation based on the hinge housing, and
      include at least one fiber structure disposed on at least a portion of a side of the first housing, the portion of the side being adjacent to the hinge housing within a predetermined distance, and
   wherein the at least one fiber structure comprises a plurality of aggregates including a plurality of fibers.

2. The electronic device of claim 1, wherein the at least one fiber structure includes a first dustproof structure disposed with a predetermined length in an axial direction of the hinge housing.

3. The electronic device of claim 2, further comprising:
   a first bent portion provided on a side edge of the first housing and formed with a predetermined curvature.

4. The electronic device of claim 3, wherein at least a portion of the first dustproof structure is disposed along a side edge of the first bent portion.

5. The electronic device of claim 3, further comprising:
   an adhesive member at least partially disposed between the first dustproof structure and the first bent portion.

6. The electronic device of claim 5, wherein at least a portion of the adhesive member includes a double-side tape.

7. The electronic device of claim 2, wherein the first dustproof structure includes a first portion that contacts the hinge housing when the electronic device is in a folded state, and a second portion that does not contact the hinge housing.

8. The electronic device of claim 7, wherein an area of the second portion is larger than an area of the first portion.

9. The electronic device of claim 7, wherein a density of fibers disposed on the first portion is higher than a density of fibers disposed on the second portion.

10. The electronic device of claim 1,
    wherein
    the plurality of aggregates comprises fiber bundles,
    wherein the at least one fiber structure includes a substrate portion including a plurality of holes, and
    wherein the fiber bundles are disposed in the plurality of holes.

11. The electronic device of claim 10, wherein the plurality of holes are arranged in a zigzag arrangement.

12. The electronic device of claim 1, further comprising:
    a second bent portion provided on a side edge of the second housing and bent with a predetermined curvature.

13. The electronic device of claim 12, wherein the at least one fiber structure includes a second dustproof structure disposed along a side edge of the second bent portion.

14. The electronic device of claim 13, further comprising:
    an adhesive member at least partially disposed between the second dustproof structure and the second bent portion.

15. The electronic device of claim 1, wherein the at least one fiber structure includes a third dustproof structure provided on a side edge of the hinge housing.

16. The electronic device of claim 15, wherein the third dustproof structure includes:
    a first portion maintaining an upright state when facing at least a portion of structures including the flexible display; and
    a second portion pressed by the portion of structures including the flexible display.

17. The electronic device of claim 16, wherein the third dustproof structure is formed such that a density of the first portion of the third dustproof structure is higher than a density of the second portion of the third dustproof structure.

18. The electronic device of claim 1, wherein the at least one fiber structure further includes a fourth dustproof structure provided on an opposite side edge of the hinge housing.

19. The electronic device of claim 18, wherein the fourth dustproof structure includes:
    a first portion disposed side by side with the flexible display; and
    a second portion disposed side by side with the flexible display and including fibers longer than fibers of the first portion of the fourth dustproof structure.

20. The electronic device of claim 19, wherein the fourth dustproof structure is formed such that a density of the first portion of the fourth dustproof structure is higher than a density of the second portion of the fourth dustproof structure.

21. The electronic device of claim 1, wherein ends of the hinge housing comprise obstruction walls which protrude such that an inside of the hinge housing is not visible from outside.

22. The electronic device of claim 1, wherein each aggregate is inserted into a sac or a hole of a predetermined pattern.

23. The electronic device of claim 1, further comprising a first hinge structure attached to the first housing and a second hinge structure attached to the second housing, wherein the first hinge structure and the second hinge structure are arranged symmetrically with respect to a center portion of the hinge housing.

24. The electronic device of claim 1, further comprising a gear structure configured to perform the folding or unfolding operation symmetrically.

25. The electronic device of claim 1, wherein the fiber structure comprises at least one of artificial fiber, natural fiber, optical fiber, or glass fiber.

* * * * *